(12) United States Patent
Cho et al.

(10) Patent No.: US 9,619,021 B2
(45) Date of Patent: Apr. 11, 2017

(54) HEAD MOUNTED DISPLAY PROVIDING EYE GAZE CALIBRATION AND CONTROL METHOD THEREOF

(71) Applicant: LG ELECTRONICS INC., Seoul (KR)

(72) Inventors: Eunhyung Cho, Seoul (KR); Sinae Chun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 119 days.

(21) Appl. No.: 14/490,365

(22) Filed: Sep. 18, 2014

(65) Prior Publication Data

US 2015/0002394 A1 Jan. 1, 2015

Related U.S. Application Data

(63) Continuation-in-part of application No. 14/142,564, filed on Dec. 27, 2013, which is a (Continued)

(30) Foreign Application Priority Data

Jan. 9, 2013 (KR) ........................ 10-2013-0002558
Feb. 28, 2013 (WO) ................. PCT/KR2013/001655
(Continued)

(51) Int. Cl.
  G06F 3/01 (2006.01)
  G06K 9/00 (2006.01)
(Continued)

(52) U.S. Cl.
  CPC .......... G06F 3/013 (2013.01); G02B 27/0093 (2013.01); G02B 27/017 (2013.01);
(Continued)

(58) Field of Classification Search
  CPC ... G06F 3/013; G02B 27/017; G02B 27/0093; G02B 2027/0138; G02B 2027/014; G02B 2027/0187
  See application file for complete search history.

(56) References Cited

U.S. PATENT DOCUMENTS 6,346,929 B1  2/2002  Fukushima et al.
7,369,101 B2  5/2008  Sauer et al.
(Continued)

FOREIGN PATENT DOCUMENTS

CN  101163236 A  4/2008
JP  8-6708 A  1/1996
(Continued)

*Primary Examiner* — Amr Awad
*Assistant Examiner* — Stephen Bray
(74) *Attorney, Agent, or Firm* — Birch, Stewart, Kolasch & Birch, LLP

(57) ABSTRACT

A control method of a head mounted display (HMD) is disclosed. The control method includes detecting a first route of a first moving object and a second route of a second moving object in front of the HMD, detecting a third route along which a user's eye gaze moves, setting the first moving object as a reference object if the detected first route identical with the detected third route, setting the second moving object as the reference object if the detected second route identical with the detected third route, and setting a focus of the camera unit on the set reference object based on a route of the set reference object and the detected third route.

19 Claims, 22 Drawing Sheets

Related U.S. Application Data continuation-in-part of application No. 13/772,444, filed on Feb. 21, 2013, now abandoned.

(30) Foreign Application Priority Data

| Dec. 11, 2013 | (KR) | ......................... 10-2013-0153840 |
| Dec. 24, 2013 | (WO) | ................. PCT/KR2013/012093 |
| Jul. 1, 2014 | (KR) | ......................... 10-2014-0081852 |

(51) Int. Cl.

| *G02B 27/01* | (2006.01) |
| *G06F 3/0481* | (2013.01) |
| *G02B 27/00* | (2006.01) |
| *G06K 9/32* | (2006.01) |

(52) U.S. Cl.
CPC .......... *G06F 3/017* (2013.01); *G06F 3/04815* (2013.01); *G06K 9/00335* (2013.01); *G06K 9/00604* (2013.01); *G06K 9/3233* (2013.01); *G02B 2027/014* (2013.01); *G02B 2027/0138* (2013.01); *G02B 2027/0187* (2013.01)

(56) References Cited

U.S. PATENT DOCUMENTS

| 8,235,529 | B1 | 8/2012 | Raffle et al. |
| 9,264,702 | B2 | 2/2016 | Liu et al. |
| 2001/0015763 | A1* | 8/2001 | Miwa ...................... G02B 7/28 |
| | | | 348/345 |
| 2006/0152434 | A1 | 7/2006 | Sauer et al. |
| 2008/0084472 | A1 | 4/2008 | Trudeau et al. |
| 2011/0128364 | A1 | 6/2011 | Ono |
| 2011/0141010 | A1 | 6/2011 | Sakata et al. |
| 2011/0170065 | A1* | 7/2011 | Sugio ................. G06K 9/00604 |
| | | | 351/209 |
| 2011/0214082 | A1 | 9/2011 | Osterhout et al. |
| 2011/0234619 | A1 | 9/2011 | Tokunaga |
| 2011/0254865 | A1 | 10/2011 | Yee et al. |
| 2011/0310006 | A1 | 12/2011 | Edwards et al. |
| 2012/0083312 | A1 | 4/2012 | Kim |
| 2012/0154619 | A1* | 6/2012 | Lee ....................... G06K 9/228 |
| | | | 348/222.1 |
| 2012/0206452 | A1 | 8/2012 | Geisner et al. |
| 2012/0302289 | A1 | 11/2012 | Kang |
| 2012/0323515 | A1 | 12/2012 | Liu et al. |
| 2013/0050432 | A1* | 2/2013 | Perez ................. H04N 13/0278 |
| | | | 348/47 |
| 2013/0095924 | A1* | 4/2013 | Geisner ................... A63F 13/00 |
| | | | 463/32 |
| 2013/0128364 | A1 | 5/2013 | Wheeler et al. |
| 2013/0135204 | A1 | 5/2013 | Raffle et al. |
| 2013/0142387 | A1 | 6/2013 | Gomez et al. |
| 2013/0328762 | A1 | 12/2013 | McCulloch et al. |
| 2014/0002444 | A1* | 1/2014 | Bennett ................... G06F 3/012 |
| | | | 345/419 |
| 2014/0152558 | A1 | 6/2014 | Salter et al. |
| 2015/0003819 | A1* | 1/2015 | Ackerman ............. G02B 7/287 |
| | | | 396/51 |
| 2015/0084864 | A1* | 3/2015 | Geiss ....................... G06F 3/013 |
| | | | 345/158 |

FOREIGN PATENT DOCUMENTS

| JP | 2004-62393 A | 2/2004 |
| JP | 2011-120887 A | 6/2011 |
| JP | 2011-180867 A | 9/2011 |
| WO | WO 2012/118575 A2 | 9/2012 |

* cited by examiner (a)

(a)

(b)

(a)

(b)

(a)

(b)

(a)

(b)

(a)

(b)

(a)

(b)

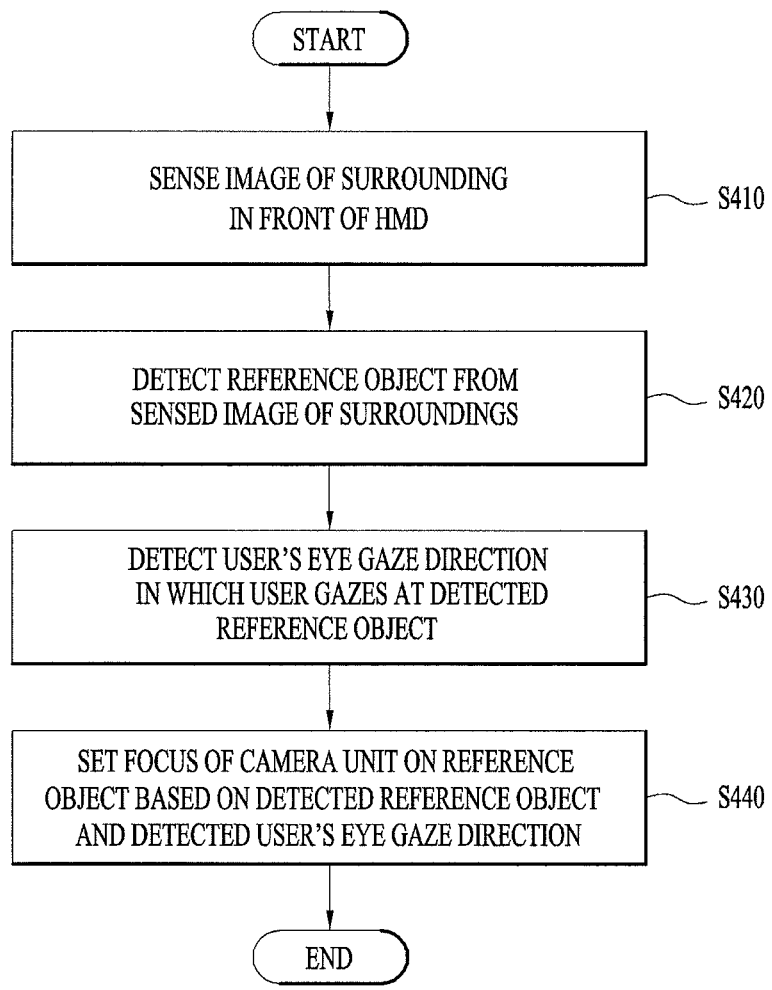

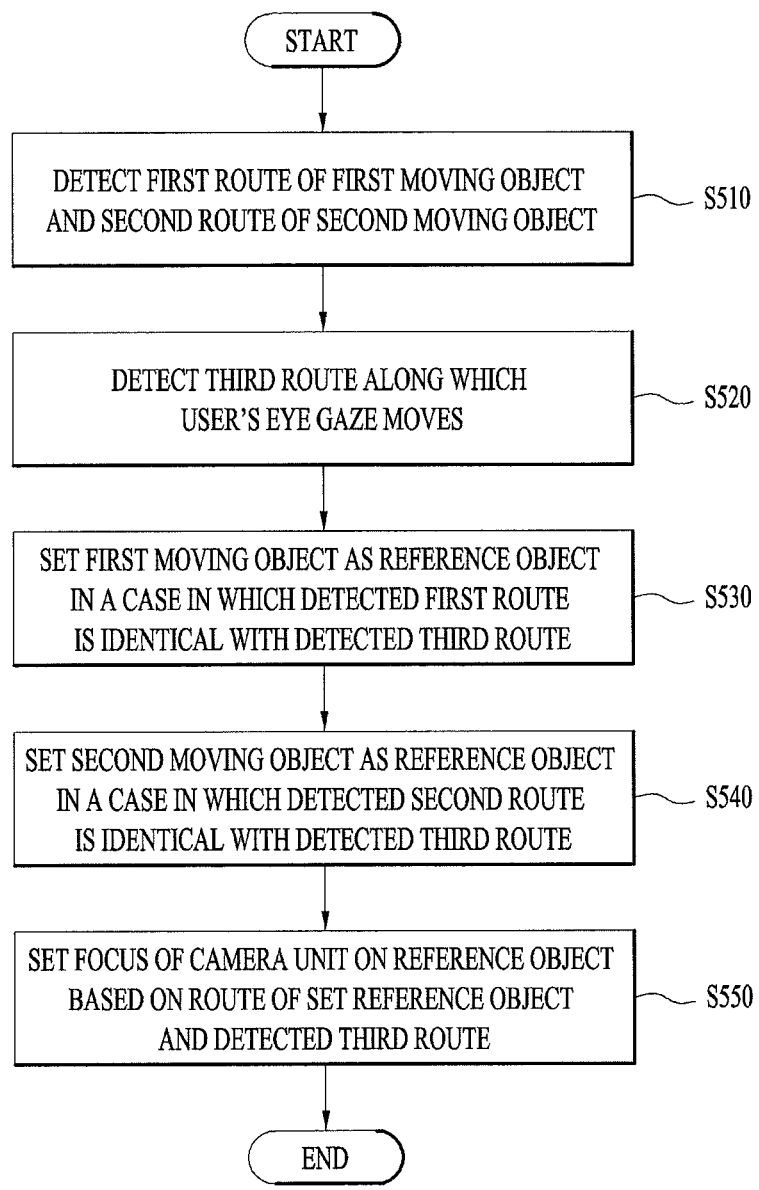

HEAD MOUNTED DISPLAY PROVIDING EYE GAZE CALIBRATION AND CONTROL METHOD THEREOF

The present application is a Continuation-in-Part application of copending U.S. patent application Ser. No. 14/142,564 filed on Dec. 27, 2013, which is a Continuation-in-Part application of U.S. patent application Ser. No. 13/772,444 filed on Feb. 21, 2013. The present application also claims priority under 35 U.S.C. §119(a) to Korean Application No. 10-2014-0081852 filed on Jul. 1, 2014 and to International Patent Application No. PCT/KR2013/012093 filed on Dec. 24, 2013. Prior U.S. patent application Ser. No. 14/142,564 claims priority under 35 U.S.C. §119(a) to Korean Application No. 10-2013-0153840 filed on Dec. 11, 2013 and to International Patent Application No. PCT/KR2013/001655 filed on Feb. 28, 2013. Prior U.S. patent application Ser. No. 13/772,444 claims priority under 35 U.S.C. §119(a) to Korean Application Nos. 10-2013-0002558 filed on Jan. 9, 2013. All of these applications are hereby expressly incorporated by reference into the present application.

BACKGROUND OF THE INVENTION

Field of the Invention

The present specification relates to a head mounted display (HMD), and more particularly, to an HMD that is capable of calibrating a user's eye gaze direction and a control method thereof.

Discussion of the Related Art

A head mounted display (HMD) may be worn by a user like glasses. The user may receive digital information displayed on the HMD. The HMD may calibrate a user's eye gaze direction to detect which the user gazes at. The HMD may adjust the position of the digital information displayed on the HMD based on the user's eye gaze direction and provide the user with digital information including an adjusted display position. In order to perform eye gaze calibration, it is necessary for the HMD to provide an eye gaze calibration screen to the user such that the user views the eye gaze calibration screen. Also, it is necessary for the user to perform a process for an eye gaze calibration before using the HMD. As a result, it is necessary for the user to have time to perform the eye gaze calibration of the HMD, which is troublesome.

In addition, in a case in which the HMD captures an image for a moving object, it is necessary for the HMD to perform an additional operation to set a focus of the camera unit, which is troublesome.

SUMMARY OF THE INVENTION

Accordingly, the present specification is directed to a head mounted display (HMD) providing an eye gaze calibration and a control method thereof that substantially obviate one or more problems due to limitations and disadvantages of the related art.

An object of the present specification is to provide an eye gaze calibration method of an HMD that does not require time to calibrate a user's eye gaze direction.

Additional advantages, objects, and features of the specification will be set forth in part in the description which follows and in part will become apparent to those having ordinary skill in the art upon examination of the following or may be learned from practice of the specification. The objectives and other advantages of the specification may be realized and attained by the structure particularly pointed out in the written description and claims hereof as well as the appended drawings.

In addition, according to embodiments of the present specification, it is necessary for an HMD to provide a method of controlling a focus of a camera unit based on a user's eye gaze direction to a user.

To achieve these objects and other advantages and in accordance with the purpose of the invention, as embodied and broadly described herein, an HMD includes a camera unit configured to detect a first route of a first moving object and a second route of a second moving object in front of the HMD, an eye gaze detection unit configured to detect a third route along which a user's eye gaze moves, and a controller configured to control a focus of the camera unit based on a route of a reference object and the detected third route, wherein, if the detected first route substantially identical with the detected third route, the controller sets the first moving object as the reference object and sets the focus of the camera unit on the first moving object and, if the detected second route substantially identical with the detected third route, the controller sets the second moving object as the reference object and sets the focus of the camera unit on the second moving object.

In another aspect of the present specification, a control method of an HMD includes detecting a first route of a first moving object and a second route of a second moving object in front of the HMD, detecting a third route along which a user's eye gaze moves, setting the first moving object as a reference object if the detected first route substantially identical with the detected third route, setting the second moving object as the reference object if the detected second route substantially identical with the detected third route, and setting a focus of the camera unit on the set reference object based on a route of the set reference object and the detected third route.

It is to be understood that both the foregoing general description and the following detailed description of the present specification are exemplary and explanatory and are intended to provide further explanation of the specification as claimed.

BRIEF DESCRIPTION OF THE DRAWINGS

The accompanying drawings, which are included to provide a further understanding of the specification and are incorporated in and constitute a part of this application, illustrate embodiment(s) of the specification and together with the description serve to explain the principle of the specification. In the drawings:

FIG. 19 is a flowchart showing a method of deciding a reference object according to an embodiment of the present specification;

FIG. 20 is a flowchart showing a method of deciding a reference object according to another embodiment of the present specification.

DETAILED DESCRIPTION OF THE INVENTION

Reference will now be made in detail to the preferred embodiments of the present specification, examples of which are illustrated in the accompanying drawings. It should be noted herein that these embodiments are only for illustrative purposes and the protection scope of the specification is not limited or restricted thereto.

Terms used in this specification are general terms selected in consideration of functions and widely used at the present time. However, such terms may vary depending upon intentions of those skilled in the art to which the present specification pertains, usual practices, or appearance of new technology. In a specific case, some terms may be selected by the applicant of the present application. In this case, meanings of such terms will be described in corresponding paragraphs of the specification. Therefore, it should be noted that terms used in this specification be interpreted based on real meanings of the terms and the disclosure of the present specification, not simple names of the terms.

In embodiments of the present specification, a head mounted display (HMD) may include a computer that a user wears on the head, i.e. a wearable computer. In embodiments of the present specification, a virtual object may be an object displayed on a display unit of the HMD. For example, the HMD may display virtual objects, such as an application icon, an alarm message, an augmented reality (AR) message, a navigation direction indicator, and a notification message, on the display unit.

Also, in embodiments of the present specification, a real object may be an object contained in the surroundings sensed by a camera unit of the HMD. For example, the real object may include various objects contained in a visual field of a user in a state in which the use wears the HMD. The HMD may sense a region corresponding to the visual field of the user as an image using the camera unit. Also, the HMD may distinguish objects contained in the sensed image using an image processing unit.

Also, in embodiments of the present specification, a reference object may be an object at which a user gazes when the HMD calibrates a user's eye gaze direction. The reference object may be a criterion for eye gaze calibration. Also, a reference point may be a portion of the reference object. The reference point may be used to improve accuracy of eye gaze calibration.

Figure 1:
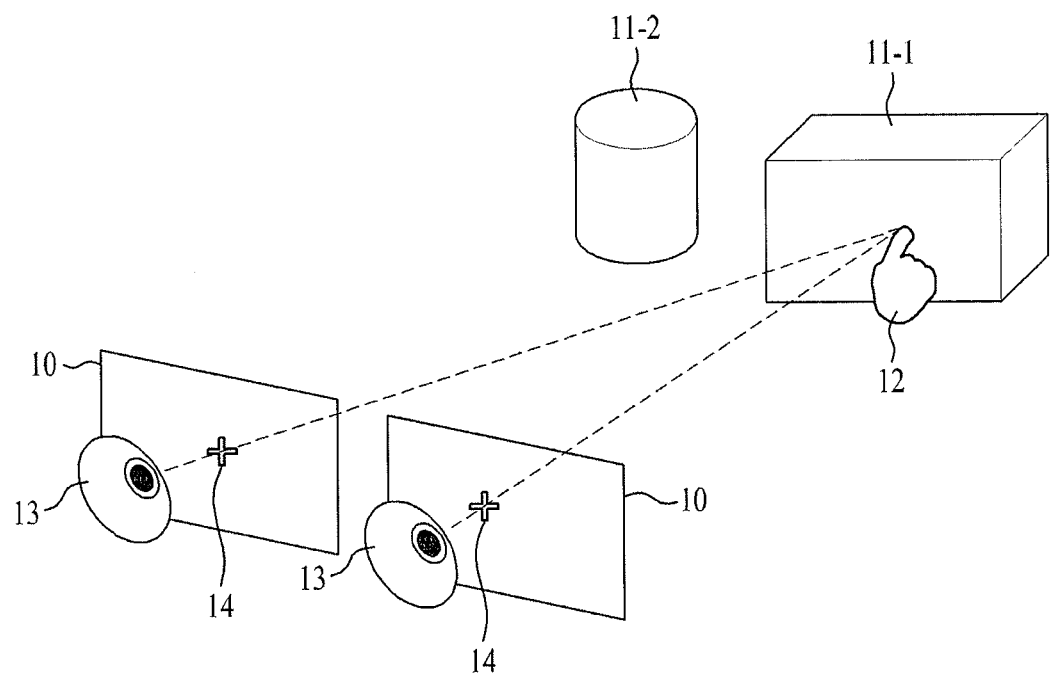
FIG. 1 is a view showing an eye gaze calibration method of a head mounted display (HMD) according to an embodiment of the present specification.

FIG. 1 is a view showing an eye gaze calibration method of an HMD according to an embodiment of the present specification. The HMD may detect a reference object and a user's eye gaze direction as a reference point for eye gaze calibration to perform the eye gaze calibration. According to embodiments, the HMD may decide a reference point as the reference point instead of the reference object. The HMD may detect at least one real object or a portion of the body of a user contained in the surroundings using an image processing unit. The HMD may detect an event on the real object. The HMD may detect a user's operation of controlling or instructing a real object as an event on the real object. The HMD may decide the real object, on which the event has been detected, as a reference object of the eye gaze calibration. The HMD may perform eye gaze calibration based on the position of the reference object and a user's eye gaze direction in which the user gazes at the reference object.

The HMD 10 may detect at least one real object 11-1 and 11-2 contained in the surroundings. Also, the HMD 10 may detect a portion of the body of the user. In FIG. 1, a hand 12 of the user is shown as an example of a portion of the body of the user. The HMD 10 may distinguish between a hand of the user and a hand of another person using at least one of a shape of the hand of the user and a gesture of the hand of the user. The HMD 10 may detect an event on the real object by the hand of the user. The HMD 10 may detect a user's operation of touching the real object using the hand or instructing the real object as the event on the real object. The HMD 10 may decide the real object 11-1, on which the event has been detected, as a reference object of the eye gaze calibration. Also, the HMD 10 may decide a portion of the reference object, on which the event has been detected, as a reference point. The HMD 10 may detect a user's eye gaze direction. The HMD 10 may detect the position of a pupil 13 of the user to decide the user's eye gaze direction.

The HMD 10 may perform eye gaze calibration based on the position of the decided reference object and the position of the pupil 13 of the user. Alternatively, the HMD 10 may perform eye gaze calibration based on the position of the decided reference point and the position of the pupil 13 of the user. If the HMD 10 performs the eye gaze calibration based on the position of the reference point, the eye gaze calibration may be performed with higher accuracy than in a case in which the HMD 10 performs the eye gaze calibration based on the position of the reference object.

The HMD 10 may set a virtual line linking the pupil 13 of the user to the reference object and calculate an intersection point 14 between the virtual line and the HMD. Alternatively, the HMD 10 may set a virtual line linking the pupil 13 of the user to the reference point and calculate the intersection point 14 between the virtual line and the HMD. The HMD 10 may decide the position of digital information to be displayed on the HMD based on the calculated position of the intersection point 14.

As described above, the HMD 10 has an effect in that the HMD 10 may perform eye gaze calibration while a user wears and uses the HMD 10 without using an additional calibration screen or calibration time.

Figure 2:
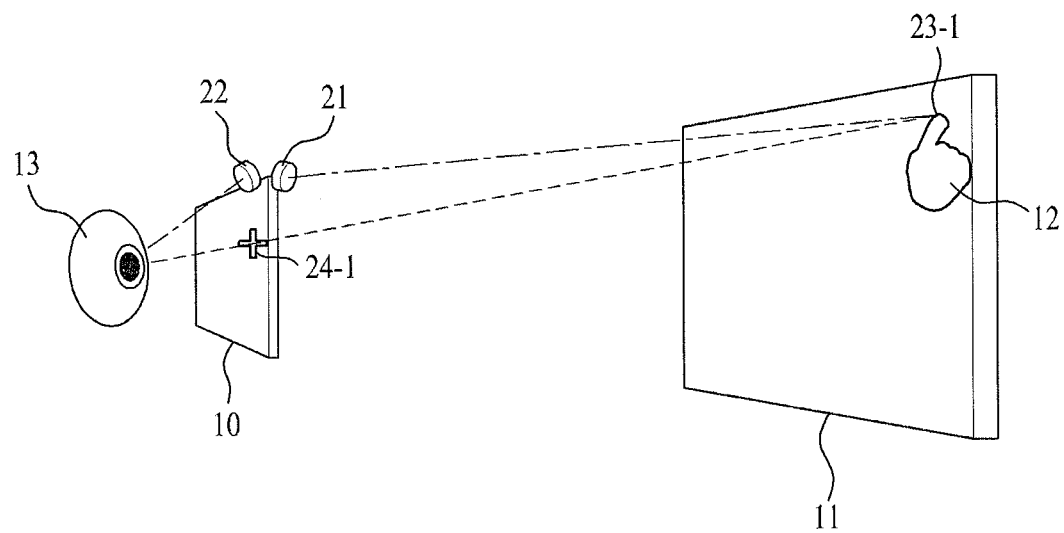
FIG. 2 is a view showing an eye gaze calibration method of an HMD using a reference point according to an embodiment of the present specification.
Figure 2:
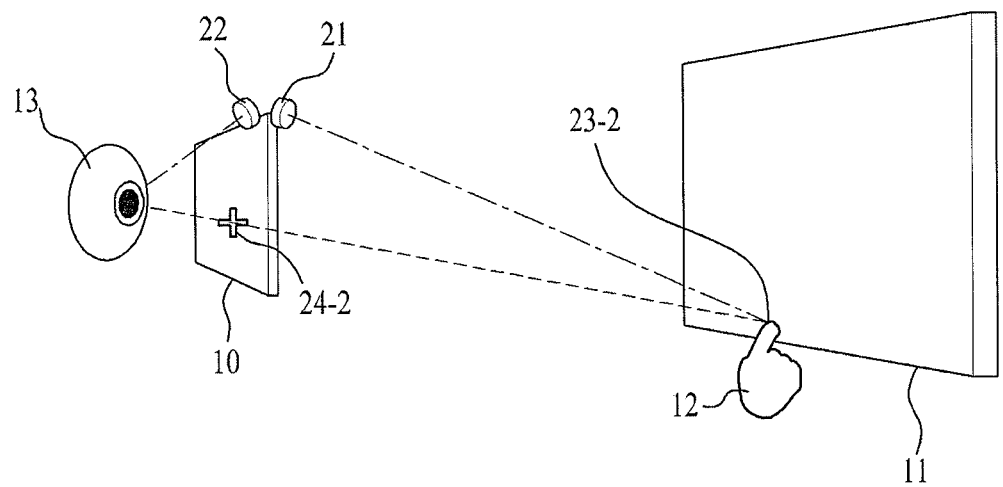

FIGS. 2(*a*) and 2(*b*) are views showing an eye gaze calibration method of an HMD using a reference point according to an embodiment of the present specification. The HMD 10 may decide a portion of a reference object as a reference point such that the reference point is used to perform the eye gaze calibration. The HMD 10 may detect an event on the reference object by a hand of the user. The HMD 10 may decide a point of the reference object on which the event has been generated as the reference point.

Referring to FIG. 2(*a*), the HMD 10 may decide a reference object 11 as described with reference to FIG. 1. The HMD 10 may detect a hand 12 of the user and detect a first event for the hand 12 of the user to touch the right side upper end of the reference object 11. The HMD 10 may decide the right side upper end of the reference object, on which the first event has been generated, as a first reference point 23-1 using a camera unit 21 and an image processing unit. The HMD 10 may decide a user's eye gaze direction in which the user gazes at the first reference point 23-1 using an eye gaze detection unit 22. The HMD 10 may detect the position of a pupil 13 of the user to decide the user's eye gaze direction. The HMD 10 may set a virtual line 25 linking the pupil 13 of the user to the first reference point 23-1 and calculate the position of a first intersection point 24-1 between the virtual line 25 and the HMD. That is, the HMD 10 may perform eye gaze calibration based on the position of the pupil 13 of the user and the position of the first reference point 23-1 and calculate the position of the first intersection point 24-1 as mentioned above as the result of the eye gaze calibration. The HMD 10 may decide the position of a virtual object to be displayed on the HMD based on the calculated position of the first intersection point 24-1.

In a case in which the detected position of the hand of the user is changed, the HMD 10 may detect this as another event, which is different from the existing event. Referring to FIG. 2(*b*), the HMD 10 may detect a second event for the hand 12 of the user to touch the middle lower end of the reference object 11. The HMD 10 may decide the middle lower end of the reference object 11, on which the second event has been generated, as a second reference point 23-2 using the camera unit 21 and the image processing unit. The HMD 10 may decide a user's eye gaze direction in which the user gazes at the second reference point 23-2 using the eye gaze detection unit 22. The HMD 10 may detect the position of the pupil 13 of the user to decide the user's eye gaze direction. The HMD 10 may set a virtual line 25 linking the pupil 13 of the user to the second reference point 23-2 and calculate the position of a second intersection point 24-2 between the virtual line 25 and the HMD. That is, the HMD 10 may perform eye gaze calibration based on the position of the pupil 13 of the user and the position of the second reference point 23-2 and calculate the position of the second intersection point 24-2 as mentioned above as the result of the eye gaze calibration. The HMD 10 may decide the position of a virtual object to be displayed on the HMD based on the calculated position of the second intersection point 24-2.

Figure 3:
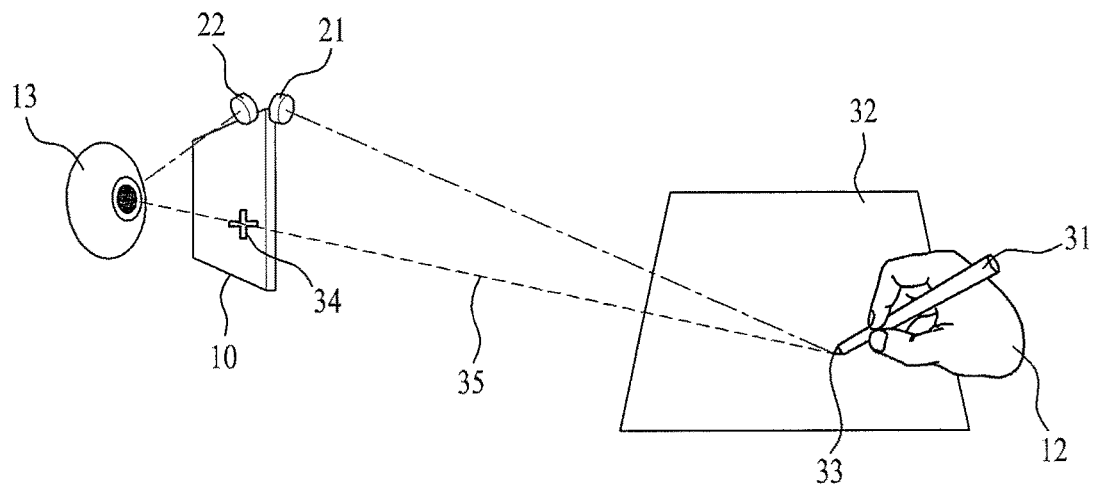
FIG. 3 is a view showing examples of a reference object and a reference point according to an embodiment of the present specification.
Figure 3:
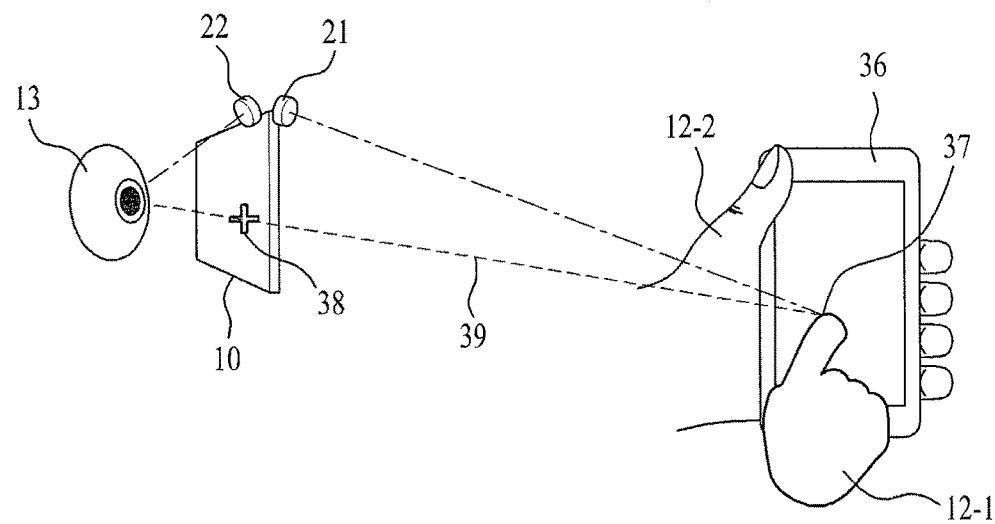

FIGS. 3(*a*) and 3(*b*) are views showing examples of a reference object and a reference point according to an embodiment of the present specification. The HMD 10 may detect a real object and a hand of the user. The HMD 10 may detect an event on the real object by the hand of the user. The HMD 10 may decide the real object, on which the event has been detected, as a reference object. The HMD 10 may decide a point of the reference object, on which the event has been detected, as a reference point. The HMD 10 may use at least one of the decided reference object and the decided reference point to perform the eye gaze calibration.

FIG. 3(*a*) shows eye gaze calibration using a writing operation performed by the user using a pen. The HMD 10 may detect a pen 31 and a notebook 32 as a real object using the camera unit 21 and the image processing unit. Also, the HMD 10 may detect a hand 12 of the user performing a writing operation while holding the pen 31. The HMD 10 may detect an operation of performing the writing operation using the hand 12 of the user while holding the pen 31 as an event. As a result, the HMD 10 may decide the pen 31 as a reference object. Also, the HMD 10 may decide the tip or a pen point of the pen 31 contacting the notebook 32 as a reference point.

In a case in which the eye gaze calibration is performed using the reference object, the HMD 10 may perform eye gaze calibration using the position of the pen 31, which is the reference object, and a user's eye gaze direction. The HMD 10 may detect the position of the pupil 13 of the user using the eye gaze detection unit 22 and decide the user's eye gaze direction based thereupon. The HMD 10 may set a virtual line 35 linking the pupil 13 of the user to the reference object 31 and calculate the position of an intersection point 34 between the virtual line 35 and the HMD. That is, the HMD 10 may perform eye gaze calibration based on the position of the pupil 13 of the user and the position of the reference object 31 and calculate the position of the intersection point 34 as mentioned above as the result of the eye gaze calibration. The HMD 10 may decide the position of a virtual object to be displayed on the HMD based on the calculated position of the intersection point 34.

In a case in which the eye gaze calibration is performed using the reference point, the HMD 10 may decide the tip or the pen point of the pen 31, which is the reference object, as a reference point 33. The HMD 10 may perform eye gaze calibration using the position of the reference point and a user's eye gaze direction. The HMD 10 may detect the position of the pupil 13 of the user using the eye gaze detection unit 22 and decide the user's eye gaze direction based thereupon. The HMD 10 may set a virtual line 35 linking the pupil 13 of the user to the reference point 33 and calculate the position of an intersection point 34 between the virtual line 35 and the HMD. That is, the HMD 10 may perform eye gaze calibration based on the position of the pupil 13 of the user and the position of the reference point 33 and calculate the position of the intersection point 34 as mentioned above as the result of the eye gaze calibration. The HMD 10 may decide the position of a virtual object to be displayed on the HMD based on the calculated position of the intersection point 34.

FIG. 3(b) shows eye gaze calibration using a user's operation of controlling a portable device. The HMD 10 may detect a portable device 36 as a real object using the camera unit 21 and the image processing unit. Also, the HMD 10 may detect a hand 12-2 of the user gripping the portable device 36 and a hand 12-1 of the user touching the portable device 36. The HMD 10 may detect an operation of touching the portable device 36 using at least one of the hand 12-1 of the user and an operation of gripping the portable device 36 using the hand 12-2 of the user as an event. As a result, the HMD 10 may decide the portable device 36 as a reference object. Also, the HMD 10 may decide a portion of the portable device 36, which the hand 12-1 of the user has touched, as a reference point.

In a case in which the eye gaze calibration is performed using the reference object, the HMD 10 may perform eye gaze calibration using the position of the portable device 36, which is the reference object, and a user's eye gaze direction. The HMD 10 may detect the position of the pupil 13 of the user using the eye gaze detection unit 22 and decide the user's eye gaze direction base thereupon. The HMD 10 may set a virtual line 39 linking the pupil 13 of the user to the reference object 36 and calculate the position of an intersection point 38 between the virtual line 39 and the HMD. That is, the HMD 10 may perform eye gaze calibration based on the position of the pupil 13 of the user and the position of the reference object 36 and calculate the position of the intersection point 38 as mentioned above as the result of the eye gaze calibration. The HMD 10 may decide the position of a virtual object to be displayed on the HMD based on the calculated position of the intersection point 38.

In a case in which the eye gaze calibration is performed using the reference point, the HMD 10 may decide a point of the reference object, i.e. the portable device 36, on which the event has been generated, as a reference point 37. For example, in a case in which the hand of the user touches an object displayed on the portable device 36, a point of the object, which the user has touched, may be decided as a reference point 37. The HMD 10 may perform eye gaze calibration using the position of the reference point and a user's eye gaze direction. The HMD 10 may detect the position of the pupil 13 of the user using the eye gaze detection unit 22 and decide the user's eye gaze direction based thereupon. The HMD 10 may set a virtual line 39 linking the pupil 13 of the user to the reference point 37 and calculate the position of an intersection point 38 between the virtual line 39 and the HMD. That is, the HMD 10 may perform eye gaze calibration based on the position of the pupil 13 of the user and the position of the reference point 37 and calculate the position of the intersection point 38 as mentioned above as the result of the eye gaze calibration. The HMD 10 may decide the position of a virtual object to be displayed on the HMD based on the calculated position of the intersection point 38.

Figure 4:
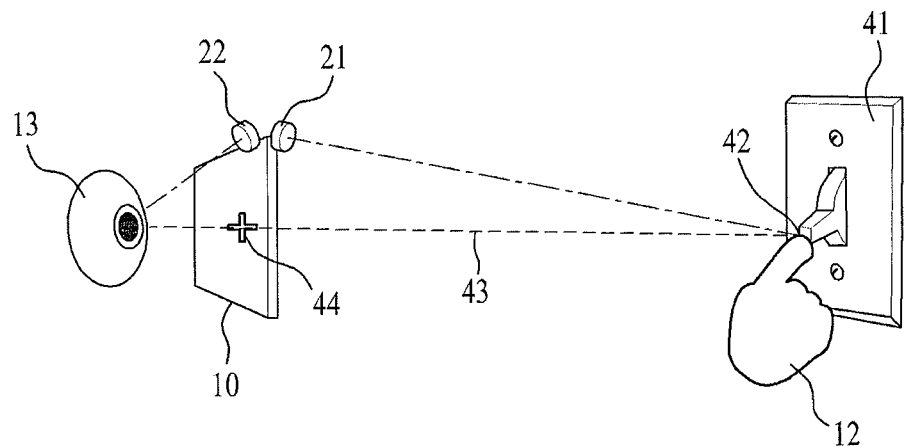
FIG. 4 is a view showing examples of a reference object and a reference point according to another embodiment of the present specification.
Figure 4:
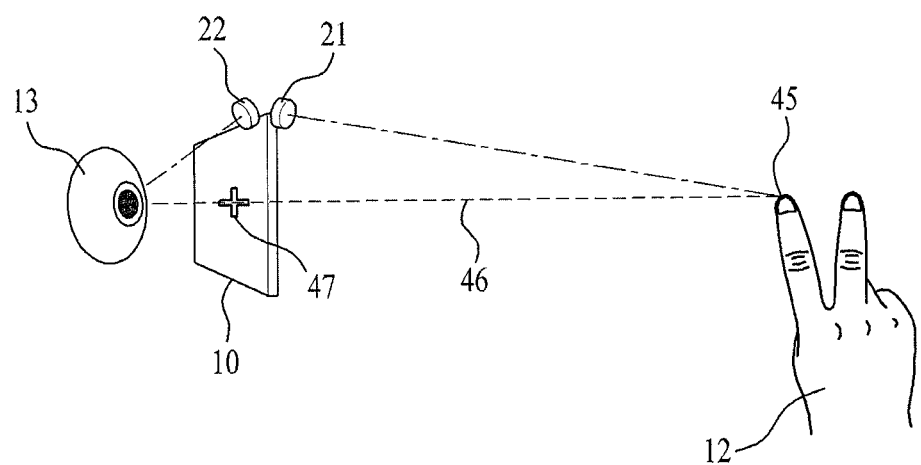

FIGS. 4(*a*) and 4(*b*) are views showing examples of a reference object and a reference point according to another embodiment of the present specification. The HMD 10 may detect a real object and a hand of the user. The HMD 10 may detect an event on the real object by the hand of the user. The HMD 10 may decide the real object, on which the event has been detected, as a reference object. The HMD 10 may decide a point of the reference object, on which the event has been detected, as a reference point. The HMD 10 may use at least one of the decided reference object and the decided reference point to perform the eye gaze calibration. Also, the HMD 10 may detect the hand of the user as a real object. The HMD 10 may detect at least one of a gesture of the hand of the user and a shape of the hand of the user and decide the detected hand of the user as a reference object together with a predetermined gesture or shape of the hand of the user. Also, the HMD 10 may decide a portion of the hand of the user as a reference point.

FIG. 4(*a*) shows eye gaze calibration using a user's operation of controlling a switch. The HMD 10 may detect a switch 41 as a real object using the camera unit 21 and the image processing unit. Also, the HMD 10 may detect a hand 12 of the user to control the switch 41. The HMD 10 may detect an operation of controlling the switch 41 using the hand 12 of the user as an event. As a result, the HMD 10 may decide the switch 41 as a reference object. Also, the HMD 10 may decide a portion of the switch, which the hand 12 of the user has touched, as a reference point.

In a case in which the eye gaze calibration is performed using the reference object, the HMD 10 may perform eye gaze calibration using the position of the switch 41, which is the reference object, and a user's eye gaze direction. The HMD 10 may detect the position of the pupil 13 of the user using the eye gaze detection unit 22 and decide the user's eye gaze direction based thereupon. The HMD 10 may set a virtual line 43 linking the pupil 13 of the user to the reference object 41 and calculate the position of an intersection point 44 between the virtual line 43 and the HMD. That is, the HMD 10 may perform eye gaze calibration based on the position of the pupil 13 of the user and the position of the reference object 41 and calculate the position of the intersection point 44 as mentioned above as the result of the eye gaze calibration. The HMD 10 may decide the position of a virtual object to be displayed on the HMD based on the calculated position of the intersection point 44.

In a case in which the eye gaze calibration is performed using the reference point, the HMD 10 may decide a portion of the switch 41, which is the reference object, which the hand of the user has touched, as a reference point 42. The HMD 10 may perform eye gaze calibration using the position of the reference point and a user's eye gaze direction. The HMD 10 may detect the position of the pupil 13 of the user using the eye gaze detection unit 22 and decide the user's eye gaze direction based thereupon. The HMD 10 may set a virtual line 43 linking the pupil 13 of the user to the reference point 42 and calculate the position of an intersection point 44 between the virtual line 43 and the HMD. That is, the HMD 10 may perform eye gaze calibration based on the position of the pupil 13 of the user and the position of the reference point 42 and calculate the position of the intersection point 44 as mentioned above as the result of the eye gaze calibration. The HMD 10 may decide the position of a virtual object to be displayed on the HMD based on the calculated position of the intersection point 44.

Also, the HMD 10 may detect the hand of the user as a real object. The HMD 10 may detect at least one of a gesture of the hand of the user and a shape of the hand of the user and decide the detected hand of the user as a reference object together with at least one of a predetermined gesture and shape of the hand of the user. Also, the HMD 10 may decide a portion of the hand of the user as a reference point.

FIG. 4(*b*) shows eye gaze calibration using a hand of the user as a reference object. The HMD 10 may detect a hand 12 of the user as a real object using the camera unit 21 and the image processing unit. The HMD 10 may detect at least one of a gesture and a shape indicated by the hand 12 of the user as an event. The HMD 10 may store at least one of a gesture and a shape of the hand of the user for the eye gaze calibration. The HMD 10 may compare the gesture indicated by the hand 12 of the user with the stored gesture to decide whether the event has been generated. Upon determining that the gesture indicated by the hand 12 of the user matches the stored gesture, the HMD 10 may detect this as event generation. Also, the HMD 10 may compare the shape indicated by the hand 12 of the user with the stored shape of the hand to decide whether the event has been generated. Upon determining that the shape indicated by the hand 12 of the user matches the stored shape of the hand, the HMD 10 may detect this as event generation.

When the HMD 10 detects an event based on the gesture or the shape of the hand 12 of the user, the HMD 10 may decide the hand 12 of the user as a reference object. Also, the HMD 10 may decide a portion of the hand 12 of the user as a reference point. For example, the HMD 10 may decide the tip of a finger of the user as a reference point 45. The HMD 10 may decide which portion of the hand of the user becomes a reference point with respect to a plurality of gestures or hand shapes. That is, in a case in which a first gesture has been detected, the HMD 10 may decide a first portion of the hand of the user as a reference point, and, in a case in which a second gesture has been detected, the HMD 10 may decide a second portion of the hand of the user as a reference point. Also, in a case in which a first hand shape has been detected, the HMD 10 may decide a first portion of the hand of the user as a reference point, and, in a case in which a second hand shape has been detected, the HMD 10 may decide a second portion of the hand of the user as a reference point. For example, in a case in which the HMD 10 has detected a V-shaped hand gesture as shown in FIG. 4(b), the HMD 10 may decide the tip of the index finger as a reference point. On the other hand, in a case in which the HMD 10 has detected a hand with only the thumb stretched upward, the HMD 10 may decide a nail of the thumb as a reference point.

The HMD 10 may perform eye gaze calibration using the position of the reference point and a user's eye gaze direction. The HMD 10 may detect the position of the pupil 13 of the user using the eye gaze detection unit 22 and decide the user's eye gaze direction based thereupon. The HMD 10 may set a virtual line 46 linking the pupil 13 of the user to the reference point 45 and calculate the position of an intersection point 47 between the virtual line 46 and the HMD. That is, the HMD 10 may perform eye gaze calibration based on the position of the pupil 13 of the user and the position of the reference point 45 and calculate the position of the intersection point 47 as mentioned above as the result of the eye gaze calibration. The HMD 10 may decide the position of a virtual object to be displayed on the HMD based on the calculated position of the intersection point 47.

Figure 5:
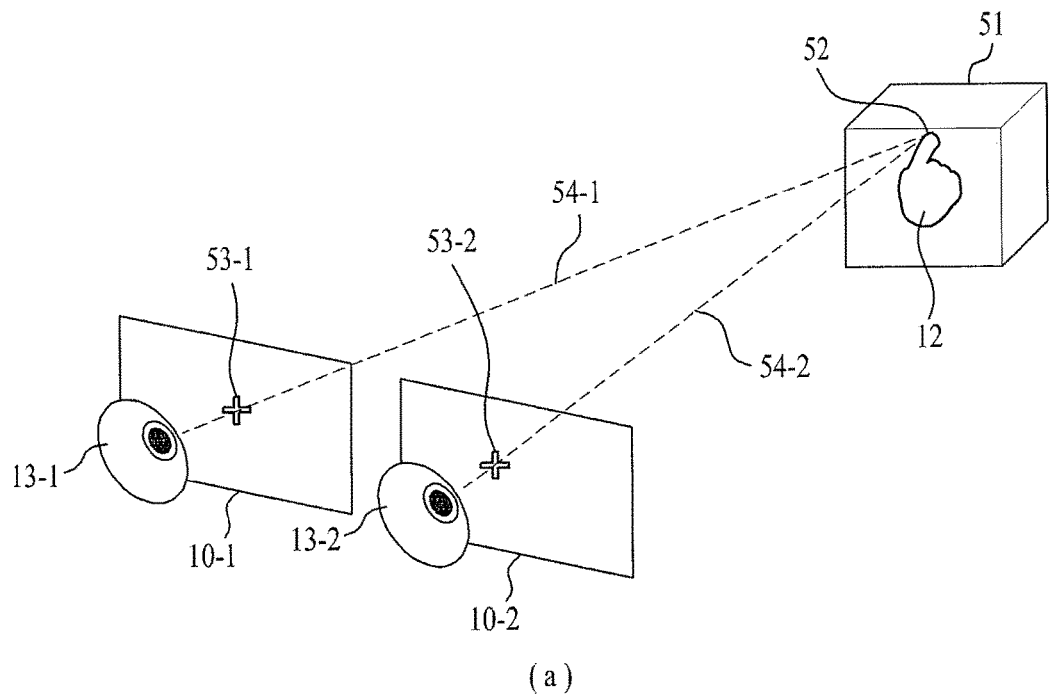
FIG. 5 is a view showing a method of displaying an augmented reality message using eye gaze calibration according to an embodiment of the present specification.
Figure 5:
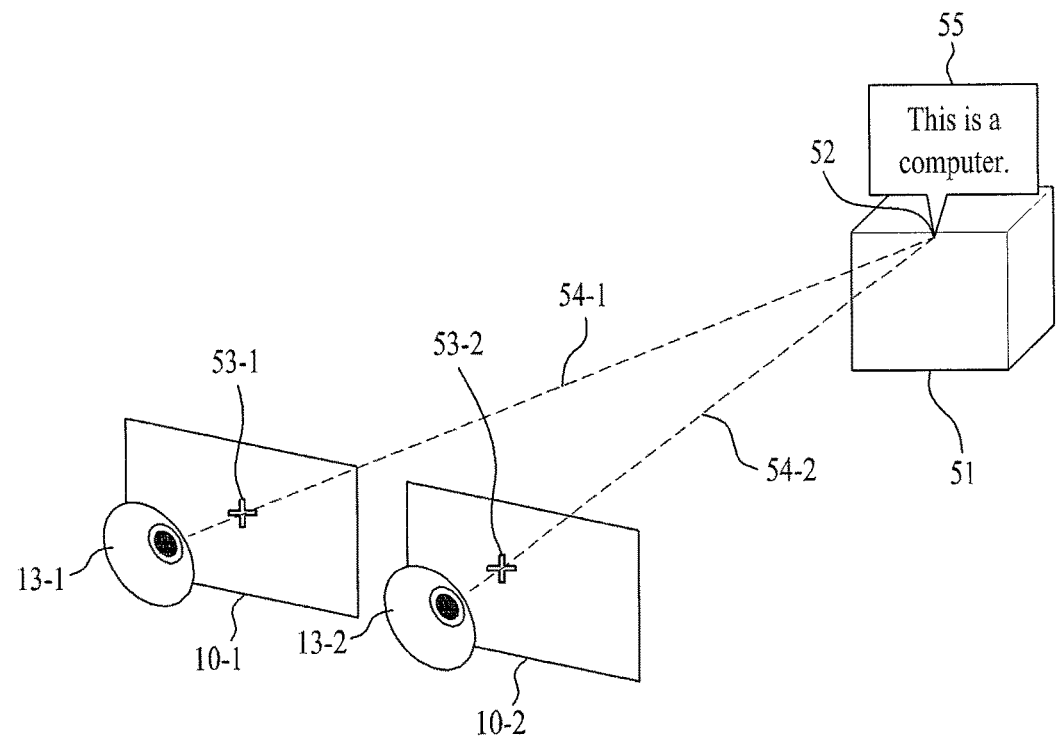

FIGS. 5(a) and 5(b) are views showing a method of displaying an augmented reality (AR) message using eye gaze calibration according to an embodiment of the present specification. An HMD may display an augmented reality message using eye gaze calibration. The HMD may provide a left eye and a right eye of a user with a left image and a right image, respectively, to display an image having depth. That is, the HMD may provide the user with a three-dimensional image using binocular disparity between the left image and the right image.

When a reference point is decided by a hand of the user, the HMD may measure the distance from the HMD to the reference point using a distance measurement unit. The HMD may decide depth of an augmented reality message based on the measured distance from the HMD to the reference point. As a result, the HMD may display an augmented reality message based on the depth of the reference point.

FIG. 5(a) is a view showing a method of performing eye gaze calibration with respect to both eyes of a user using a reference point. The HMD may include a left subunit 10-1 to provide a graphical user interface to a left eye of the user and a right subunit 10-2 to provide a graphical user interface to a right eye of the user. Each subunit of the HMD may include a camera unit and an eye gaze detection unit. Hereinafter, particulars common to the left subunit and the right subunit will be described in terms of the HMD.

The HMD 10-1 and 10-2 may detect a reference object 51 and a hand 12 of the user. The HMD 10-1 and 10-2 may detect an event in which the hand 12 of the user touches a portion of the reference object 51. The HMD 10-1 and 10-2 may decide a point of the reference object, on which the event has been generated, as a reference point 52 using a camera unit and an image processing unit. The HMD 10-1 and 10-2 may decide a user's eye gaze direction in which the user gazes at the reference point 52 using an eye gaze detection unit. The HMD may detect the position of a pupil 13 of the user to decide the user's eye gaze direction.

The left subunit 10-1 of the HMD may set a first virtual line 54-1 linking a pupil 13-1 of the left eye of the user to the reference point 52 and calculate the position of a first intersection point 53-1 between the first virtual line 54-1 and the left subunit 10-1. That is, the HMD may perform eye gaze calibration based on the position of the pupil 13-1 of the left eye of the user and the position of the reference point 52 and calculate the position of the first intersection point 53-1 as mentioned above as the result of the eye gaze calibration. The HMD may decide the position of a left image to be displayed on the left subunit 10-1 based on the calculated position of the first intersection point 53-1.

The right subunit 10-2 of the HMD may set a first virtual line 54-2 linking a pupil 13-2 of the right eye of the user to the reference point 52 and calculate the position of a second intersection point 53-2 between the first virtual line 54-2 and the right subunit 10-2. That is, the HMD may perform eye gaze calibration based on the position of the pupil 13-2 of the right eye of the user and the position of the reference point 52 and calculate the position of the second intersection point 53-2 as mentioned above as the result of the eye gaze calibration. The HMD may decide the position of a right image to be displayed on the right subunit 10-2 based on the calculated position of the second intersection point 53-2.

The HMD may measure the distance from the HMD to the reference point using a distance measurement unit. The distance measurement unit may measure the distance from the HMD to the reference point using at least one selected from among an ultrasonic sensor, a laser sensor, and an infrared sensor. The HMD may decide depth of an augmented reality message based on the measured distance from the HMD to the reference point. For example, the HMD may set depth of an augmented reality message such that the depth of the augmented reality message is equal to depth of the reference point. As a result, the HMD may display an augmented reality message such that the augmented reality message is located in the same plane as the reference point.

FIG. 5(b) is a view showing a method of displaying an augmented reality message using binocular disparity between a left image and a right image. The left subunit 10-1 of the HMD may display a left image, and the right subunit 10-2 of the HMD may display a right image. The HMD may display a left image corresponding to a first intersection point 53-1 and a right image corresponding to a second intersection point 53-2.

The HMD may apply depth to an augmented reality message to be displayed. That is, the HMD may generate an augmented reality message to be displayed as a left image and a right image and apply binocular disparity between the left image and the right image to convert the augmented reality message into a three-dimensional image. As a result, the HMD may display an augmented reality message 55 having depth. For example, the HMD may provide an augmented reality message 55 located in the same plane as the reference point to the user.

Figure 6:
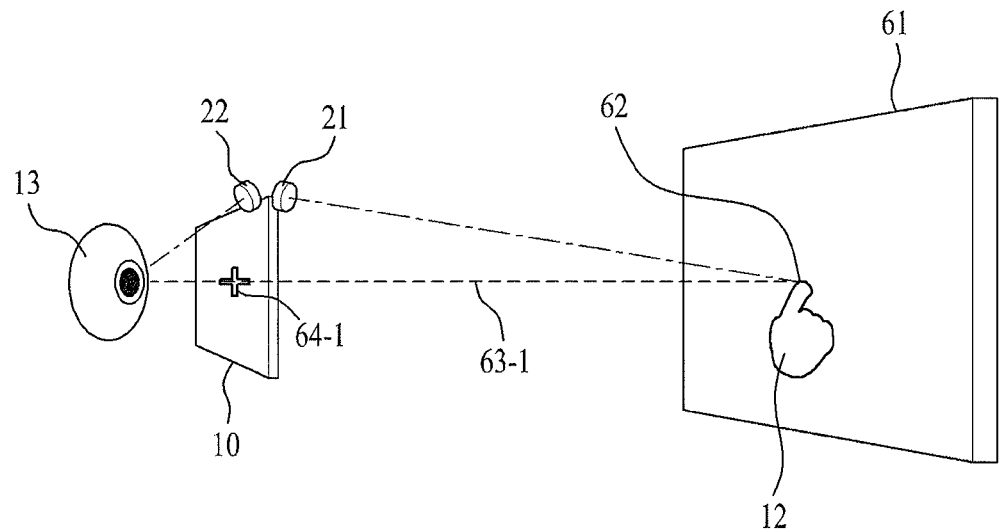
FIG. 6 is a view showing a method of correcting an intersection point of the HMD according to an embodiment of the present specification.
Figure 6:
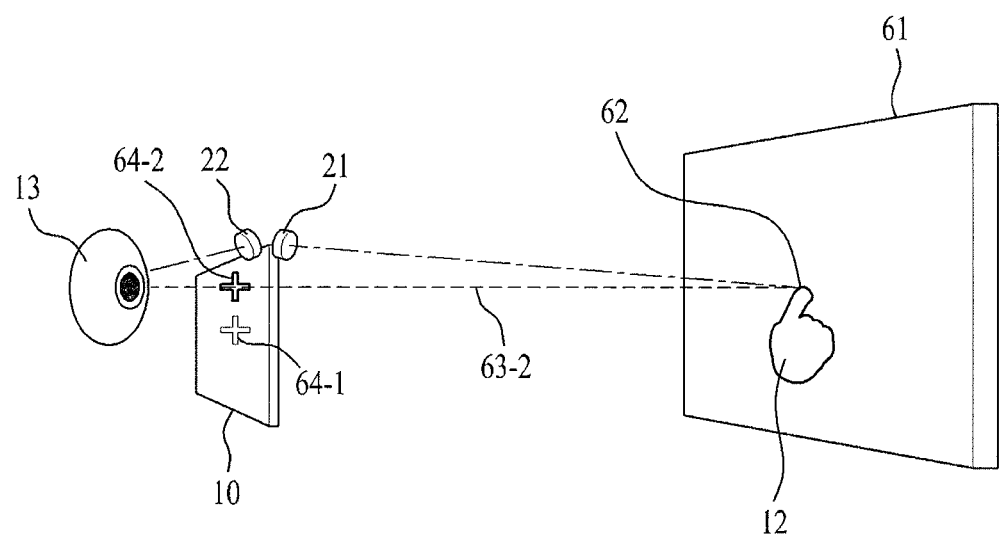

FIGS. 6(*a*) and 6(*b*) are views showing a method of correcting an intersection point of the HMD according to an embodiment of the present specification. Referring to FIG. 6(*a*), the HMD 10 may detect a reference object 61 and a hand 12 of a user. The HMD 10 may detect an event in which the hand 12 of the user touches a portion of the reference object 61. The HMD 10 may decide a point of the reference object, on which the event has been generated, as a reference point 62 using a camera unit 21 and an image processing unit. The HMD 10 may decide a user's eye gaze direction in which the user gazes at the reference point 62 using an eye gaze detection unit 22. The HMD 10 may detect the position of a pupil 13 of the user to decide the user's eye gaze direction.

The HMD 10 may set a first virtual line 63-1 linking the pupil 13 of the user to the reference point 62 and calculate the position of a first intersection point 64-1 between the first virtual line 63-1 and the HMD 10. That is, the HMD 10 may perform eye gaze calibration based on the position of the pupil 13 of the user and the position of the reference point 62 and calculate the position of the first intersection point 64-1 as mentioned above as the result of the eye gaze calibration. The HMD 10 may decide the position of a virtual object to be displayed on the HMD based on the calculated position of the first intersection point 64-1.

A relative position between the HMD 10 and the pupil of the user may be changed as the result of movement of the user. In this case, the HMD 10 may detect that it is necessary to perform or re-perform eye gaze calibration. The HMD 10 may detect the change of the relative position between the HMD 10 and the pupil of the user to correct the position of an intersection point through eye gaze calibration. The HMD 10 may detect the change of the relative position between the HMD 10 and the pupil of the user using a camera unit 22. In this case, the HMD 10 may correct the position of an intersection point through eye gaze calibration. Also, the HMD 10 may change the position of a virtual object to be displayed based on the corrected portion of the intersection point.

Referring to FIG. 6(*b*), the relative position between the HMD 10 and the pupil of the user is lower than the relative position between the HMD 10 and the pupil of the user shown in FIG. 6(*a*). In a case in which the relative position between the HMD 10 and the pupil of the user is changed, the HMD 10 may set a second virtual line 63-2 linking the pupil 13 of the user to the reference point 62 and calculate the position of a second intersection point 64-2 between the first virtual line 63-2 and the HMD 10. That is, the HMD 10 may perform eye gaze calibration based on the position of the pupil 13 of the user and the position of the reference point 62 and calculate the position of the second intersection point 64-2 as mentioned above as the result of the eye gaze calibration. The HMD 10 may decide the position of a virtual object to be displayed on the HMD 10 based on the calculated position of the second intersection point 64-2. Through the above process, the HMD 10 may correct the position of the intersection point from the first intersection point 64-1 to the second intersection point 64-2 to decide the position of a virtual object to be displayed such that the position of the virtual object corresponds to the user's eye gaze. Consequently, the embodiment of the present specification has the effect of adaptively deciding the position of a virtual object based on the relative position between the HMD and the pupil of the user.

Figure 7:
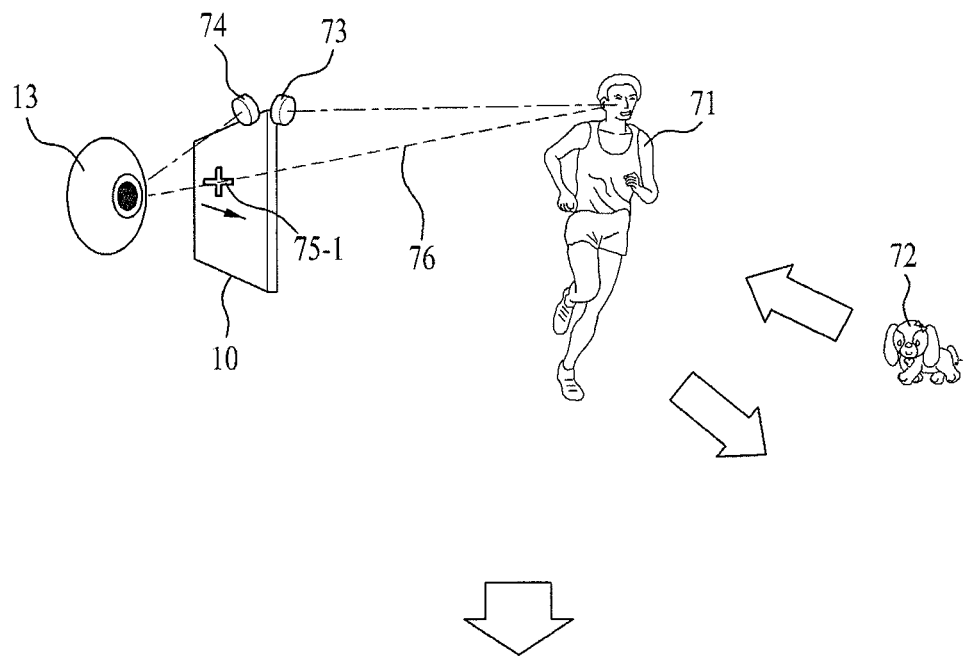
FIG. 7 is a view showing an eye gaze calibration method of an HMD using a moving object according to an embodiment of the present specification.
Figure 7:
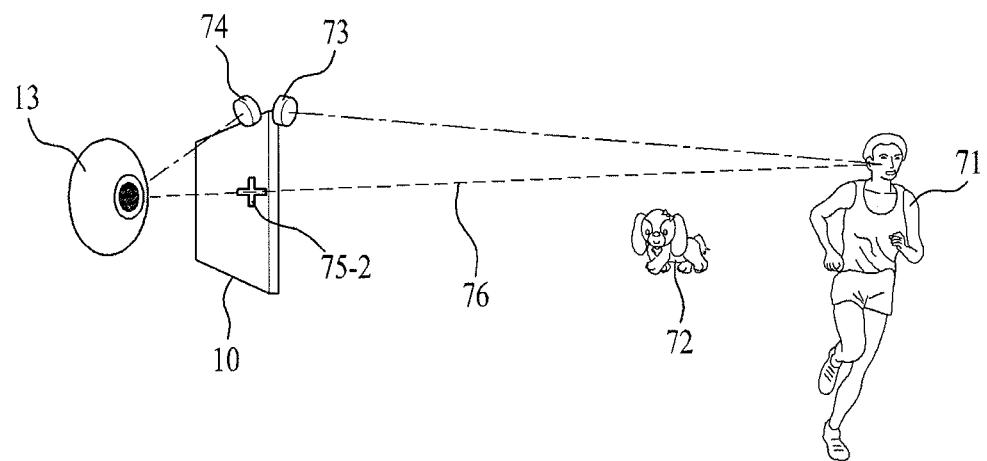

FIG. 7 is a view showing an eye gaze calibration method of an HMD using a moving object according to an embodiment of the present specification. The HMD may detect a reference object as reference of eye gaze calibration and a user's eye gaze direction to perform eye gaze calibration. The HMD may detect moving objects having mobility in front of the HMD using a camera unit. The HMD may compare routes of the moving objects with a route along which user's eye gaze moves to decide a reference object and then perform eye gaze calibration. According to embodiments, the HMD may decide a reference point, which is a portion of the reference object, as reference of eye gaze calibration. Hereinafter, the reference object will be described. However, such a description may be similarly applied to the reference point, which is a portion of the reference object.

The HMD 10 may detect at least one moving object in front of the HMD. The moving object is an object having mobility, the position of which is changed over time. The moving object may be a real object present in a real world, not a virtual object displayed on the display device. As shown in FIG. 7, the HMD may detect a first moving object 71 and a second moving object 72 through a camera unit 73. The first moving object 71 may move along a first route and the second moving object 72 may move along a second route. The HMD may detect the first route, along which the first moving object 71 moves, and the second route, along which the second moving object 72 moves, through the camera unit 73. As shown at the upper end of FIG. 7, the first moving object 71 and the second moving object 72 may move in opposite directions. Consequently, the first route of the first moving object 71 and the second route of the second moving object 72 may extend in opposite direction.

When a plurality of moving objects is detected through the camera unit 73, the HMD may include only moving objects satisfying at least one selected from among a velocity condition, a size condition, a moving direction condition, and a color condition in a reference object candidate group. The velocity condition may include a velocity threshold range. In a case in which the velocity of a moving object is too fast or too slow, it may be difficult for the HMD to decide a route of the moving object. Consequently, the HMD may include only moving objects having velocities within the velocity threshold range in the reference object candidate group. In addition, the size condition may include a size threshold range. Consequently, the HMD may include only moving objects having sizes within the size threshold range in the reference object candidate group. In addition, the moving direction condition may include a direction threshold range. In a case in which a moving object moves toward the HMD or moves far from the HMD, it may be difficult for the HMD to correctly decide a route of the moving object. Consequently, the HMD may include only moving objects moving in directions within the direction threshold range in the reference object candidate group. In addition, the color condition may be a condition in which eye gaze calibration is performed for specific colors. Consequently, the HMD may include only moving objects having colors included in the color condition in the reference object candidate group. For example, the HMD may include only red moving objects attracting user attention in the reference object candidate group. In this case, the user may recognize what colored objects are to be gazed at for eye gaze calibration and then perform the eye gaze calibration.

In FIG. 7, in a case in which the first moving object and the second moving object satisfy at least one selected from among the velocity condition, the size condition, the moving direction condition, and the color condition, the HMD may include the first moving object and the second moving object in the reference object candidate group and decide a reference object from among the moving objects included in the reference object candidate group.

The HMD may detect a user's eye gaze direction through an eye gaze detection unit 74. The HMD may detect a third route along which user's eye gaze moves. At the upper end of FIG. 7, the HMD may detect a first intersection point 75-1 at which the HMD intersects the user's eye gaze direction using the eye gaze detection unit 74. In addition, at the lower end of FIG. 7, the HMD may detect a second intersection point 75-2 at which the HMD intersects the user's eye gaze direction using the eye gaze detection unit 74. The HMD may decide the third route, along which the user's eye gaze moves, based on the fact that the first intersection point 75-1 has moved to second intersection point 75-2.

The HMD may compare the detected first route and the detected second route with the third route, along which the user's eye gaze moves, using an image processing unit. In a case in which a moving object having a route generally coinciding with the third route is present, the HMD may determine that the user gazes at the corresponding moving object. Consequently, the HMD may set the moving object having the route generally coinciding with the third route, along which the user's eye gaze moves, as a reference object. In FIG. 7, the HMD may determine that the first route of the first moving object is substantially identical with the third route of the user's eye gaze. Identification between the two routes may include a case in which the two routes are substantially identical with each other in terms of a direction and a moving rate in addition to a case in which the two routes are completely identical with each other. Consequently, the HMD may decide the first moving object, moving along the first route coinciding with the third route, as a reference object.

The HMD 10 may perform eye gaze calibration based on the position of the decided reference object and the position of a pupil of the user. Alternatively, the HMD 10 may perform eye gaze calibration based on the position of the decided reference point and the position of the pupil of the user. In a case in which the HMD 10 performs eye gaze calibration based on the position of the reference point, the eye gaze calibration may be performed with higher accuracy than in a case in which the HMD 10 performs eye gaze calibration based on the position of the reference object.

The HMD 10 may set a virtual line 76 linking the pupil 13 of the user to the reference object 71 and calculate the intersection point 75-1 or 75-2 between the virtual line 76 and the HMD. The HMD 10 may perform eye gaze calibration based on the calculated position of the intersection point. In a case in which the reference object moves from a first position to a second position, the HMD may detect a user's first eye gaze direction when the reference object is at the first position, detect a user's second eye gaze direction when the reference object is at the second position, and perform eye gaze calibration based on the first position of the reference object, the second position of the reference object, the first eye gaze direction, and the second eye gaze direction. In another embodiment, in a case in which the reference object moves from a first position to a second position, the HMD may continuously perform eye gaze calibration based on the position of the reference object and user's eye gaze moving along the reference object.

The HMD may decide the position of digital information to be displayed on the HMD according to a result of the eye gaze calibration. In addition, the HMD 10 may move the position of the digital information displayed on the HMD according to the result of the eye gaze calibration and then display the digital information.

In this way, the HMD 10 may perform eye gaze calibration using a route of user's eye gaze and a route of a moving object having mobility among real objects in a real world. Consequently, the HMD may perform eye gaze calibration while the user wears and uses the HMD 10 without using an additional calibration screen or calibration time.

Figure 8:
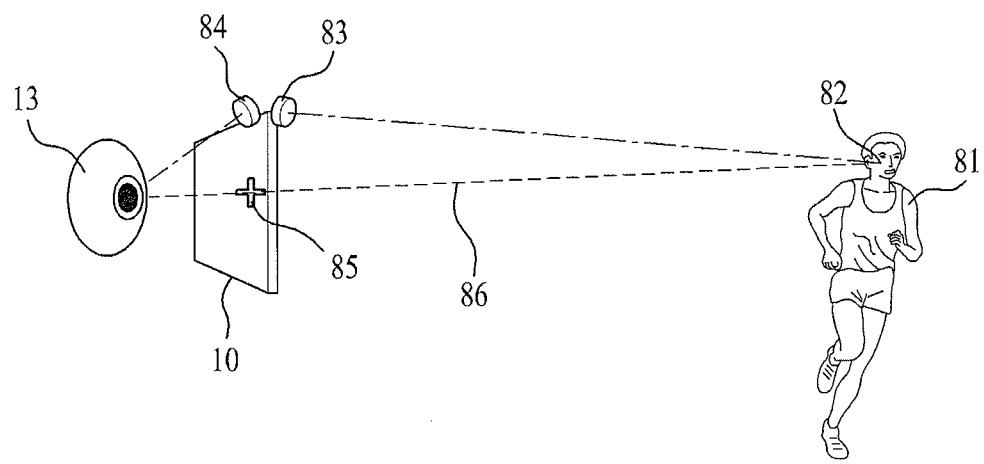
FIG. 8 is a view showing an eye gaze calibration method of an HMD using a moving object according to another embodiment of the present specification.
Figure 8:
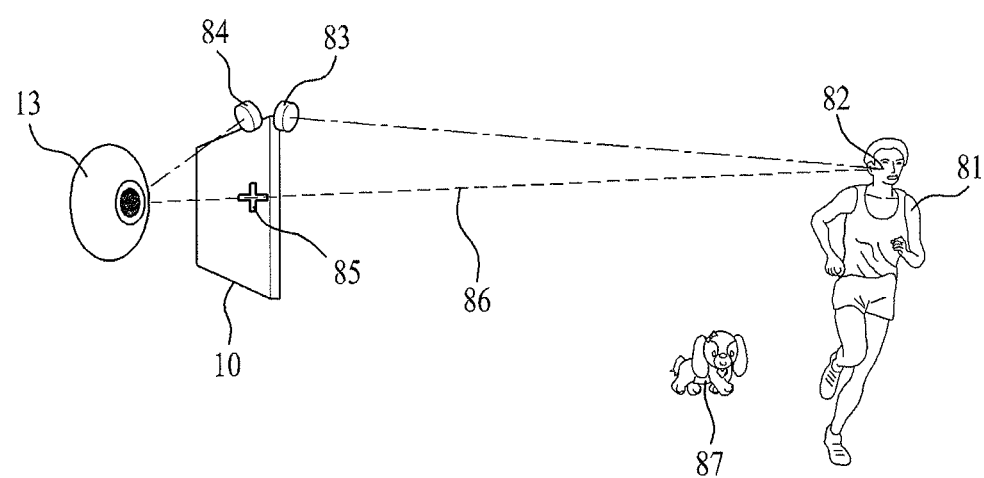

FIG. 8 is a view showing an eye gaze calibration method of an HMD using a moving object according to another embodiment of the present specification. The HMD may detect a reference object as reference of eye gaze calibration and a user's eye gaze direction to perform eye gaze calibration. The HMD may detect moving objects having mobility in front of the HMD using a camera unit. The HMD may compare routes of the moving objects with a route along which user's eye gaze moves to decide a reference object. The HMD may decide a reference point, which is a portion of the reference object, as reference of eye gaze calibration. The HMD may decide a portion of the reference object as a reference point according to point priority information. For example, in a case in which a reference object is an animal, the face of the animal may be decided as a reference point. Particularly, in a case in which a reference object is a human being, the face of the human being may be decided as a reference point. On the other hand, in a case in which a reference object is a car, the number plate, emblem, or headlight of the car may be decided as a reference point. In addition, in a case in which a place where eye gaze calibration is performed is dark, a bright portion of a reference object may be decided as a reference point.

The HMD 10 may detect at least one moving object in front of the HMD. The moving object is an object having mobility, the position of which is changed over time. The moving object may be a real object present in a real world, not a virtual object displayed on the display device. As shown at the upper end of FIG. 8, the HMD may detect a first moving object 81 through a camera unit 83. In addition, the HMD may detect a first moving point 82, which is a portion of the first moving object. The first moving point 82 may move along a first route. The HMD may detect the first route, along which the first moving point 82 moves, through the camera unit 83.

The HMD may detect a user's eye gaze direction through an eye gaze detection unit 84. The HMD may detect a second route along which user's eye gaze moves. As previously described with reference to FIG. 7, the HMD may detect movement of an intersection point at which the HMD intersects the user's eye gaze direction to decide the second route.

The HMD may compare the detected first route of the first moving point 82 with the second route, along which the user's eye gaze moves. In a case in which the first route generally is substantially identical with the second route, the HMD may determine that the user gazes at the first moving point 82. Consequently, the HMD may set the first moving point 82 having the route coinciding with the second route, along which the user's eye gaze moves, as a reference point. Identification between the two routes may include a case in which the two routes generally identical with each other in terms of a direction and a moving rate in addition to a case in which the two routes completely identical with each other. Consequently, the HMD may decide the first moving point 82, moving along the first route coinciding with the second route, as a reference point.

The HMD 10 may perform eye gaze calibration based on the position of the decided reference point and the position of a pupil of the user. In a case in which the HMD 10 performs eye gaze calibration based on the position of the reference point, the eye gaze calibration may be performed with higher accuracy than in a case in which the HMD 10 performs eye gaze calibration based on the position of the reference object.

The HMD 10 may set a virtual line 86 linking the pupil 13 of the user to the first moving point 82 as the reference point and calculate an intersection point 85 between the virtual line 86 and the HMD. The HMD 10 may perform eye gaze calibration based on the calculated position of the intersection point. The HMD may decide the position of digital information to be displayed on the HMD according to a result of the eye gaze calibration. In addition, the HMD 10 may move the position of the digital information displayed on the HMD according to the result of the eye gaze calibration and then display the digital information.

In this way, the HMD 10 may perform eye gaze calibration using a route of user's eye gaze and a route of a moving object having mobility among real objects in a real world. Consequently, the HMD may perform eye gaze calibration while the user wears and uses the HMD 10 without using an additional calibration screen or calibration time.

The lower end of FIG. 8 shows a method of deciding a reference object in a case in which a plurality of moving objects moves along the same route. The HMD 10 may detect a plurality of moving objects using the camera unit 83. In a case in which a plurality of moving objects having the same route is detected by the camera unit, the HMD may set a reference object from among the detected moving objects according to object priority information. The object priority information may include information regarding taste and tendency of a user. For example, in a case in which the user has a great interest in a car, when the HMD detects a car and a truck moving along the same route, the HMD may decide the car as a reference object. In addition, in a case in which a dog 87 and a human being 81 moving along the same route are detected as shown at the lower end of FIG. 8, the HMD may decide the human being as a reference object.

In this way, the HMD may check taste and tendency of a user to decide a moving object which the user is predicted to gaze at as a reference object in advance and then may perform eye gaze calibration. As a result, the HMD may correctly and rapidly decide a reference object as reference of eye gaze calibration.

Figure 9:
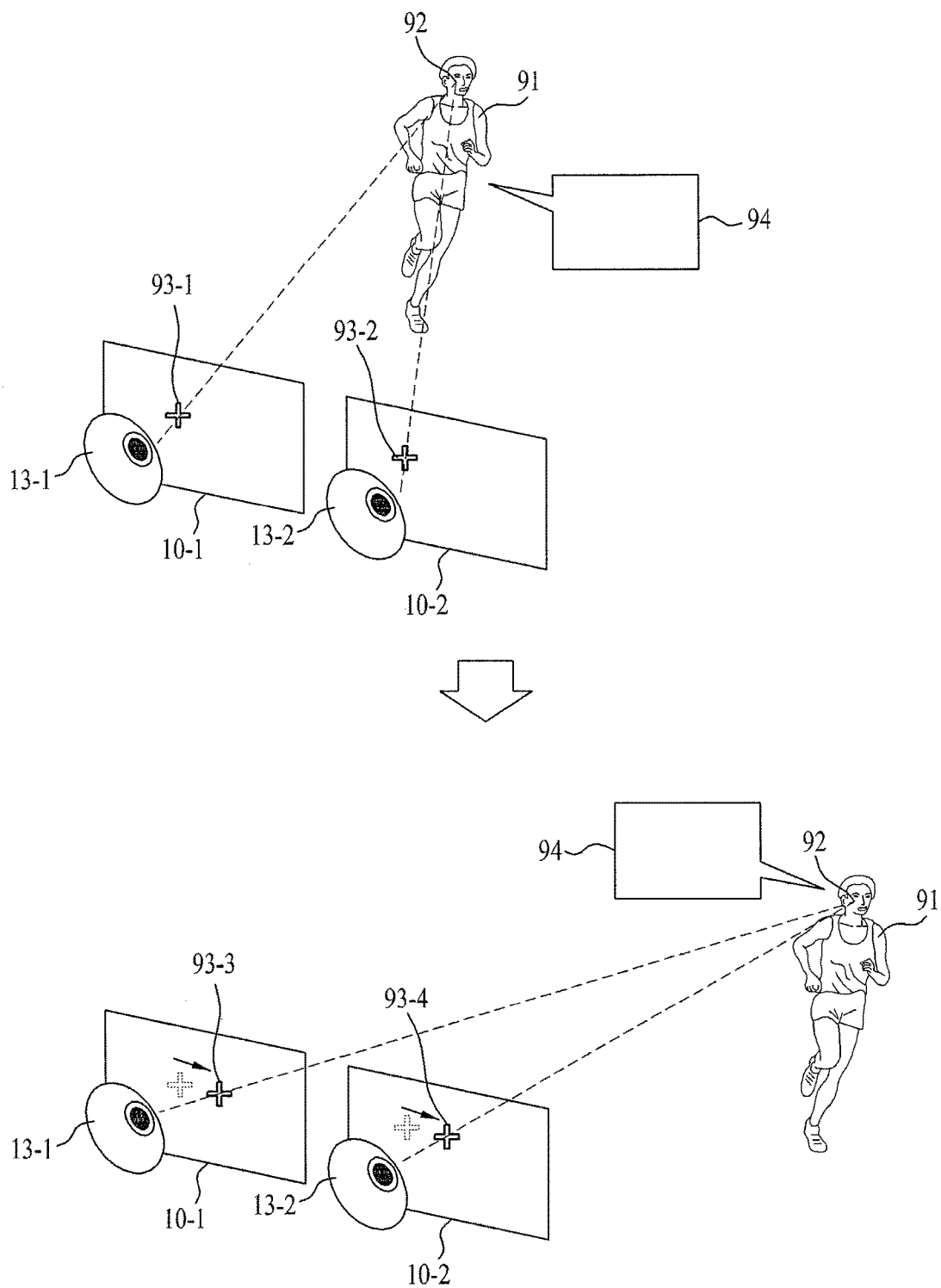
FIG. 9 is a view showing a method of performing eye gaze calibration with respect to both eyes of a user using a reference point.

FIG. 9 is a view showing a method of performing eye gaze calibration with respect to both eyes of a user using a reference point. The HMD may include a left subunit 10-1 to provide a graphical user interface to a left eye of the user and a right subunit 10-2 to provide a graphical user interface to a right eye of the user. Each subunit of the HMD may include at least one selected from between a camera unit and an eye gaze detection unit. Hereinafter, particulars common to the left subunit and the right subunit will be described in terms of the HMD.

As previously described with reference to FIG. 8, the HMD 10-1 and 10-2 may detect a reference object 91. The HMD may recognize that the reference object 91 is a human being and decide the face of the human being as a reference point 92. The HMD 10-1 and 10-2 may decide a user's eye gaze direction in which the user gazes at the reference point 92 using an eye gaze detection unit. The HMD 10-1 and 10-2 may detect the position of a pupil of the user to decide the user's eye gaze direction. The HMD may perform eye gaze calibration based on the position of the reference object 91 and the user's eye gaze direction. In a case in which the reference object 91 moves from a first position to a second position, the HMD may perform eye gaze calibration for the reference object at the first position and then perform eye gaze calibration for the reference object at the second position. In addition, the HMD may continuously perform eye gaze calibration while the reference object moves from the first position to the second position. In addition, the MID may display a virtual object according to a result of the eye gaze calibration. When the reference object moves from the first position to the second position, the displayed virtual object may be moved from the first position to the second position according to movement of the reference object and then displayed.

At the upper end of FIG. 9, the left subunit 10-1 of the HMD may set a first virtual line linking a pupil 13-1 of the left eye of the user to the reference point 92 of the reference object 91 at the first position and calculate a first intersection point 93-1 between the first virtual line and the left subunit 10-1. That is, the HMD may perform eye gaze calibration based on the position of the pupil 13-1 of the left eye of the user and the position of the reference point 92 and calculate the first intersection point 93-1 as mentioned above as a result of the eye gaze calibration. The HMD may decide the position of a left image to be displayed on the left subunit 10-1 based on the calculated position of the first intersection point 93-1. That is, the HMD may move the position of the left image according to the result of the eye gaze calibration and then display the left image.

The right subunit 10-2 of the HMD may set a second virtual line linking a pupil 13-2 of the right eye of the user to the reference point 92 of the reference object 91 at the first position and calculate a second intersection point 93-2 between the second virtual line and the right subunit 10-2. That is, the HMD may perform eye gaze calibration based on the position of the pupil 13-2 of the right eye of the user and the position of the reference point 92 and calculate the second intersection point 93-2 as mentioned above as a result of the eye gaze calibration. The HMD may decide the position of a right image to be displayed on the right subunit 10-2 based on the calculated position of the second intersection point 93-2. That is, the HMD may move the position of the right image according to the result of the eye gaze calibration and then display the position of the right image.

The HMD may measure the distance from the HMD to the reference point 92 using a distance measurement unit. The distance measurement unit may measure the distance from the HMD to the reference point using at least one selected from among an ultrasonic sensor, a laser sensor, and an infrared sensor. The HMD may decide depth of an augmented reality message based on the measured distance from the HMD to the reference point. For example, the HMD may set depth of an augmented reality message such that the depth of the augmented reality message is equal to depth of the reference point. As a result, the HMD may display an augmented reality message such that the augmented reality message is located in the same plane as the reference point with the same depth as the reference point.

The HMD may display an augmented reality message using binocular disparity between a left image and a right image. The left subunit 10-1 of the HMD may display a left image and the right subunit 10-2 of the HMD may display a right image. The HMD may display a left image corresponding to the first intersection point 93-1 and a right image corresponding to the second intersection point 93-2.

The HMD may apply depth to an augmented reality message to be displayed. That is, the HMD may generate an augmented reality message to be displayed as a left image and a right image and apply binocular disparity between the left image and the right image to convert the augmented reality message into a three-dimensional image. As a result, the HMD may display an augmented reality message 94 having depth. For example, in a case in which the depth of the reference point of the reference object located at the first position is a first depth, the HMD may provide the augmented reality message 94 located at the first depth to the user.

At the lower end of FIG. 9, the left subunit 10-1 of the HMD may set a first virtual line linking the pupil 13-1 of the left eye of the user to the reference point 92 of the reference object 91 at the second position and calculate a third intersection point 93-3 between the first virtual line and the left subunit 10-1. That is, the HMD may perform eye gaze calibration based on the position of the pupil 13-1 of the left eye of the user and the position of the reference point 92 and calculate the third intersection point 93-3 as mentioned above as a result of the eye gaze calibration. The HMD may decide the position of a left image to be displayed on the left subunit 10-1 based on the calculated position of the third intersection point 93-3. That is, the HMD may move the position of the left image according to the result of the eye gaze calibration and then display the left image.

The right subunit 10-2 of the HMD may set a second virtual line linking the pupil 13-2 of the right eye of the user to the reference point 92 of the reference object 91 at the second position and calculate a fourth intersection point 93-4 between the second virtual line and the right subunit 10-2. That is, the HMD may perform eye gaze calibration based on the position of the pupil 13-2 of the right eye of the user and the position of the reference point 92 and calculate the fourth intersection point 93-4 as mentioned above as a result of the eye gaze calibration. The HMD may decide the position of a right image to be displayed on the right subunit 10-2 based on the calculated position of the fourth intersection point 93-4. That is, the HMD may move the position of the right image according to the result of the eye gaze calibration and then display the right image.

The HMD may display an augmented reality message using binocular disparity between a left image and a right image. The left subunit 10-1 of the HMD may display a left image and the right subunit 10-2 of the HMD may display a right image. The HMD may display a left image corresponding to the third intersection point 93-3 and a right image corresponding to the fourth intersection point 93-4.

The HMD may apply depth to an augmented reality message to be displayed. That is, the HMD may generate an augmented reality message to be displayed as a left image and a right image and apply binocular disparity between the left image and the right image to convert the augmented reality message into a three-dimensional image. As a result, the HMD may display an augmented reality message 94 having depth. For example, in a case in which the depth of the reference point of the reference object having moved to the second position is a second depth, the HMD may move the augmented reality message 94 located at the first depth to the second depth and then provide the augmented reality message 94 located at the second depth to the user.

Figure 10:
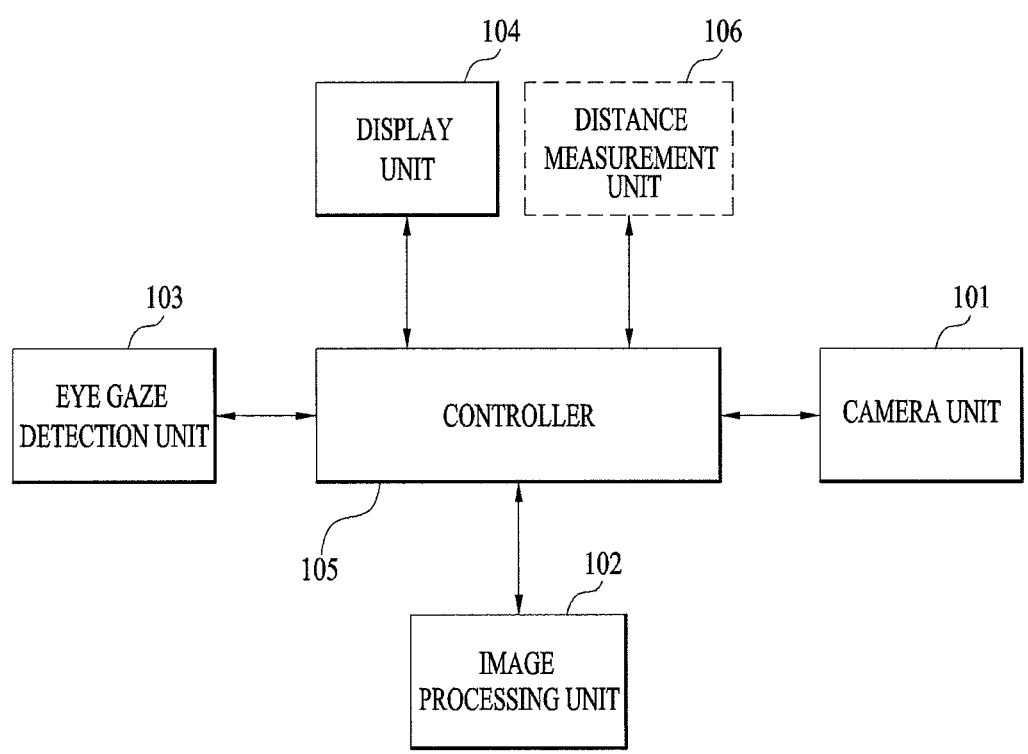
FIG. 10 is a block diagram showing an HMD according to an embodiment of the present specification.

FIG. 10 is a block diagram showing an HMD according to an embodiment of the present specification. The HMD may include a camera unit 101, an image processing unit 102, an eye gaze detection unit 103, a display unit 104, and a controller 105. In addition, the HMD may further include a distance measurement unit.

The camera unit 101 may sense an image of the surroundings located in front of the HMD. The camera unit 101 may include an image sensor. The image sensor may convert an optical signal into an electrical signal. The camera unit 101 may convert the sensed image of the surroundings into an electrical signal and transmit the electrical signal to the controller. The camera unit 101 may sense an image having a range corresponding to a visual field of a user. Consequently, the HMD may decide which of the real objects contained in the surroundings the user gazes at based on the sensed image and the position of a pupil of the user.

In addition, in a case in which the camera unit 101 senses an image, the controller 105 may adjust a focus of the camera unit 101. More specifically, the controller 105 may control the focus of the camera unit 101. The controller 105 may control the focus of the camera unit 101 based on a user input, command, or operation. The focus, which is a converging spot of light, may be decided based on optical properties of a lens or a mirror. On the other hand, the focus may mean a converging spot of light reflected by a subject, passing through a lens, and incident upon a focus plane of a film to form an image of the subject. For example, the focus may be adjusted by turning a focusing ring to the left and the right during capturing. The controller 150 may control the above-described focus of the camera unit 101, which will hereinafter be described.

The image processing unit 102 may distinguish a real object from the other object contained in the sensed image of the surroundings. The image processing unit 102 may detect at least one real object contained in the image of the surroundings as an object unit. Also, the image processing unit 102 may detect a hand of the user from the sensed image of the surroundings. The image processing unit 102 may distinguish the hand of the user from a hand of another person using at least one of a shape and a gesture of the hand of the user. The image processing unit 102 may detect an event of the hand of the user on a real object and decide the real object, on which the event has been detected, as a reference object. Also, the image processing unit 102 may decide a portion of the reference object, on which the event has been detected, as a reference point. The image processing unit 102 may transmit information regarding at least one of the decided reference object and the decided reference point to the controller.

The eye gaze detection unit 103 may detect a user's eye gaze direction. The eye gaze detection unit 103 may detect a user's eye gaze direction based on movement of a pupil of the user. Also, the eye gaze detection unit 103 may detect whether eye gaze calibration is to be re-performed based on the relative position between the HMD and the pupil of the user. The eye gaze detection unit 103 may provide information regarding the user's eye gaze direction to the controller.

The display unit 104 may display a virtual object. The virtual object may include a graphical user interface provided to the user by the display unit. The display unit 104 may display a left image and a right image on a left eye and a right eye of the user, respectively. The display unit 104 may display a virtual object having depth using binocular disparity. The display unit 104 may control the position of a virtual object to be displayed and display the virtual object according to the result of the eye gaze calibration. The display unit 104 may include a transparent optical display unit. Consequently, the user may recognize the surroundings from a visible light transmitted through the display unit 104.

The distance measurement unit may measure the distance from the HMD to a reference object. Also, the distance measurement unit may measure the distance from the HMD to a reference point. The HMD may decide depth of a virtual object to be displayed based on the distance from the HMD to the reference object or the reference point measured by the distance measurement unit. The distance measurement unit may measure the distance from the HMD to the reference object or the reference point using at least one selected from among an ultrasonic sensor, a laser sensor, and an infrared sensor. The distance measurement unit may transmit information regarding the measured distance from the HMD to the reference object or the reference point to the controller. In embodiments of the present specification, the distance measurement unit may be an optional element of the HMD.

The controller 105 may perform an application and process data in the HMD. The controller 105 may control the camera unit 101, the image processing unit 102, the eye gaze detection unit 103, and the display unit 104. Also, the controller 105 may control transmission and reception of data between the above units. In embodiments of the present specification, the controller 105 may receive an image of the surroundings from the camera unit 101. Also, the controller 105 may receive information regarding a reference object, a reference point, event generation, and position of a hand of a user from the image processing unit 102. Also, the controller 105 may receive information regarding a user's eye gaze direction from the eye gaze detection unit 103. The controller 105 may perform eye gaze calibration using the information regarding the reference object and the user's eye gaze direction. Also, the controller 105 may perform eye gaze calibration using the information regarding the reference point and the user's eye gaze direction. The controller 105 may control the position of a virtual object displayed on the display unit 104 according to the result of the eye gaze calibration.

In addition, the controller 150 may control the focus of the camera unit 101 using the information regarding the reference point and the user's eye gaze direction. The controller 105 may sense an image focused on a specific object using the camera unit 101. That is, the HMD may capture an image focused on a specific object using the information regarding the reference point and the user's eye gaze direction.

The HMD may further include a distance measurement unit 106. The distance measurement unit 106 may measure the distance from the HMD to the reference object. In addition, the distance measurement unit 106 may measure the distance from the HMD to the reference point. The HMD may decide depth of a virtual object displayed on the HMD based on the distance measured by the distance measurement unit 106. The distance measurement unit 106 may be at least one selected from among an ultrasonic sensor, a laser sensor, and an infrared sensor. The distance measurement unit 106 may transmit information regarding the measured distance to the controller. In embodiments of the present specification, the distance measurement unit may be an optional component of the HMD.

FIG. 10 is a block diagram of an embodiment of the present specification. The respective blocks indicate elements of the HMD which logically distinguish therebetween. Consequently, the elements of the HMD may be incorporated into a single chip or a plurality of chips according to design of the HMD.

Figure 11:
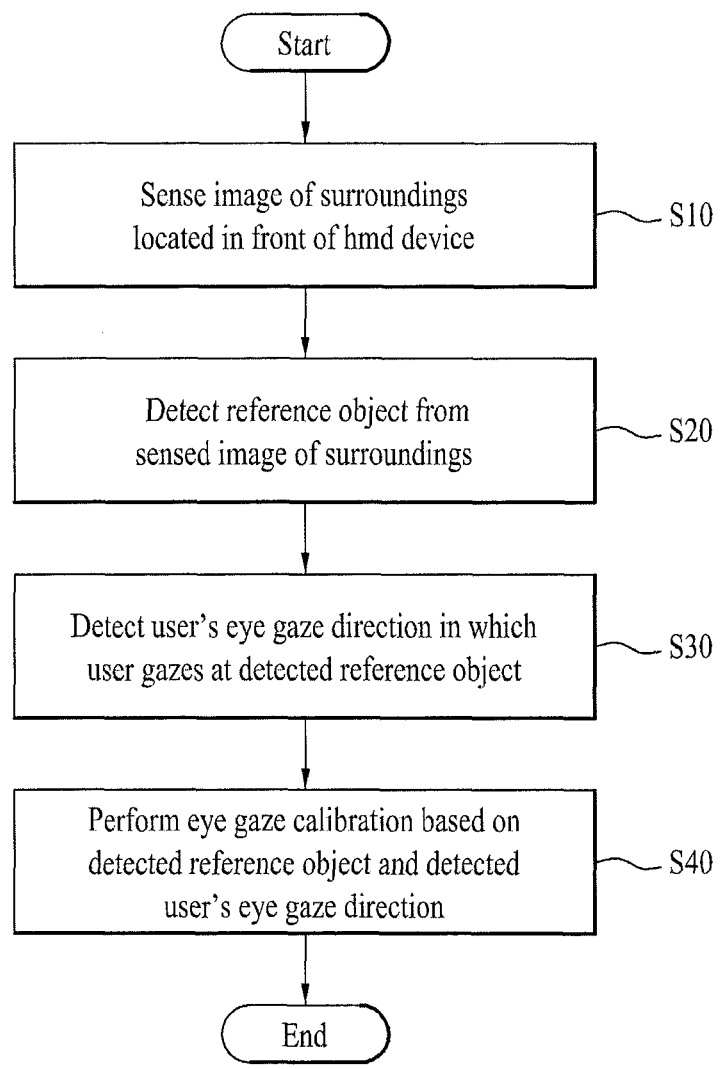
FIG. 11 is a flowchart showing an eye gaze calibration method according to an embodiment of the present specification.

FIG. 11 is a flowchart showing an eye gaze calibration method according to an embodiment of the present specification. The HMD may sense an image of the surroundings located in front of the HMD using the camera unit (S10). The HMD may sense a range corresponding to a visual field of a user.

The HMD may detect a reference object from the sensed image of the surroundings using the image processing unit (S20). As previously described with reference to FIGS. 1 to 4, the HMD may distinguish at least one real object contained in the sensed image of the surroundings as an object unit. The HMD may detect a reference object from the at least one real object distinguished as the object unit. A method of the HMD detecting a reference object will hereinafter be described in detail with reference to FIGS. 9 and 10. Also, the HMD may detect a portion of the reference object as a reference point. In this case, the HMD may perform eye gaze calibration using the position of the reference point instead of the position of the reference object such that the eye gaze calibration is accurately performed.

The HMD may decide a user's eye gaze direction in which a user gazes at the detected reference object using the eye gaze detection unit (S30). The HMD may detect the position of a pupil of a user wearing the HMD to decide the user's eye gaze direction. The HMD may correct the user's eye gaze direction based on at least one of the relative position between the HMD and the pupil of the user and the distance between the HMD and the pupil of the user.

The HMD may perform eye gaze calibration based on the detected reference object and the detected user's eye gaze direction using the controller (S40). In a case in which the eye gaze calibration is performed using the reference object as previously described with reference to FIGS. 1 to 4, the HMD may set a virtual line linking the pupil of the user to the reference object using the position of the detected reference object and the detected user's eye gaze direction. The HMD may calculate the position of an intersection point between the virtual line and the HMD. That is, the HMD may perform eye gaze calibration based on the position of the pupil of the user and the position of the reference object and calculate the position of the intersection point as mentioned above as the result of the eye gaze calibration. The HMD may decide the position of a virtual object to be displayed on the HMD based on the calculated position of the intersection point.

In a case in which the eye gaze calibration is performed using the reference point as another embodiment, the HMD may set a virtual line linking the pupil of the user to the reference point using the position of the detected reference point and the detected user's eye gaze direction. The HMD may calculate the position of an intersection point between the virtual line and the HMD. That is, the HMD may perform eye gaze calibration based on the position of the pupil of the user and the position of the reference point and calculate the position of the intersection point as mentioned above as the result of the eye gaze calibration. The HMD may decide the position of a virtual object to be displayed on the HMD based on the calculated position of the intersection point.

The virtual object may include an object displayed on the display unit of the HMD. For example, the HMD may display virtual objects, such as an application icon, an alarm message, a navigation direction indicator, and a notification message, as well as an augmented reality (AR) message described with reference to FIG. 5 on the display unit.

According to embodiments, the HMD may perform eye gaze calibration only in a case in which the difference between the direction of the reference object and the user's eye gaze direction in which the user gazes at the reference object is within an allowable error range. In a case in which the difference between the direction of the reference object and the user's eye gaze direction in which the user gazes at the reference object is out of the allowable error range, on the other hand, the HMD may suspend eye gaze calibration in order to prevent the occurrence of an error of eye gaze calibration.

Figure 12:
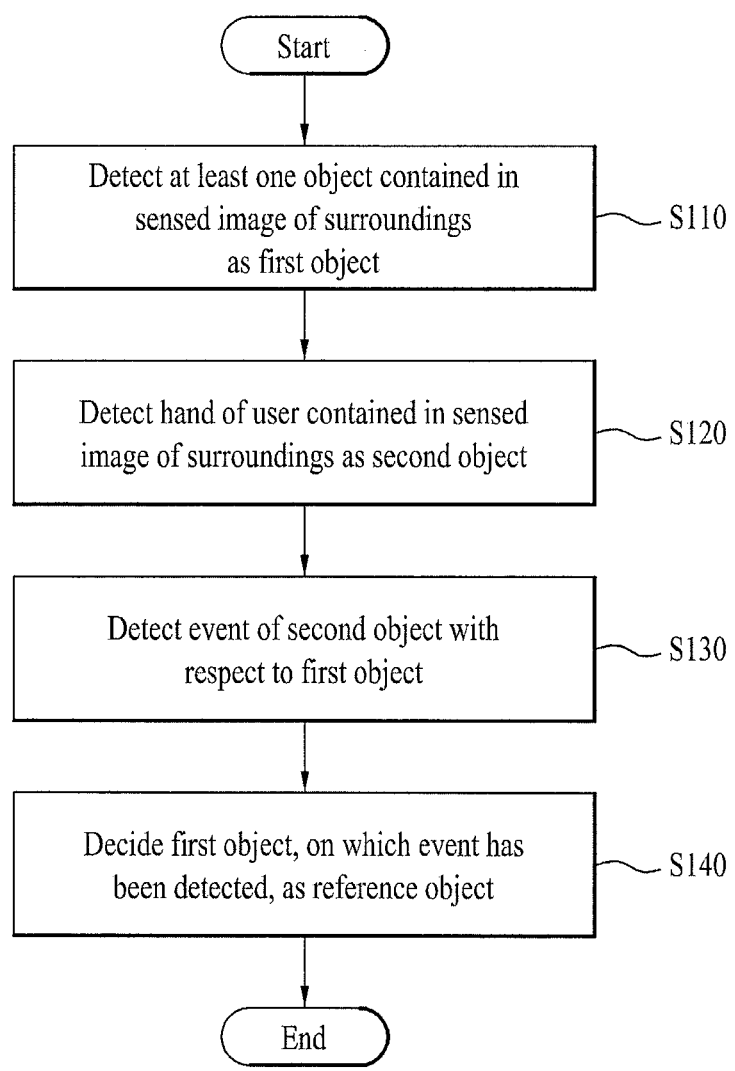
FIG. 12 is a flowchart showing a method of deciding a reference object according to an embodiment of the present specification.

FIG. 12 is a flowchart showing a method of deciding a reference object according to an embodiment of the present specification. The HMD may detect at least one object contained in the sensed image of the surroundings as a first object (S110). As previously described with reference to FIGS. 1 to 4, the HMD may extract at least one real object from the image of the surroundings using the image processing unit. The HMD may detect the extracted at least one real object as a first object. Alternatively, the HMD may detect two or more real objects as first objects.

The HMD may detect a hand of a user contained in the sensed image of the surroundings as a second object (S120). As previously described with reference to FIGS. 1 to 4, the HMD may detect the hand of the user from the image of the surroundings using the image processing unit. Also, the HMD may detect the detected hand of the user as a second object. The HMD may distinguish between the hand of the user and a hand of another person using at least one of a shape of the hand of the user and a gesture of the hand of the user. For example, when the HMD has detected a V-shaped hand gesture of the user, the HMD may detect the hand of the user as a second object. In another embodiment, the HMD may distinguish between the hand of the user and a hand of another person based on the lines of the palm of the user or the shape of a vein on the back of the hand of the user.

The HMD may detect an event of the second object with respect to the first object (S130). As previously described with reference to FIGS. 1 to 4, the HMD may detect an operation of controlling the real object detected as the first object using the hand of the user detected as the second object through the image processing unit. The HMD may detect the above operation as an event of the second object with respect to the first object.

For example, the HMD may detect an external device as a first object and the tip of a finger of the user as a second object. In a case in which the first object is a keyboard input device, the HMD may detect an operation of pressing a key of the keyboard as an event. Also, in a case in which the first object is a pen, the HMD may detect a writing operation using a pen as an event. Also, in a case in which the first object is a device including a touch sensitive display, the HMD may detect an operation of touching the touch sensitive display as an event. Also, in a case in which the first object is an electronic instrument, the HMD may detect an operation of controlling a control button of the electronic instrument as an event. The control button of the electronic instrument may include at least one selected from among a power button, volume control buttons, and channel control buttons.

The HMD may decide the first object, on which the event has been detected, as a reference object (S140). As previously described with reference to FIGS. 1 to 4, the HMD may decide the first object, on which the event has been detected, as a reference object using the image processing unit. That is, the HMD may detect one of the detected first objects, i.e. the first object, on which the event has been detected, as a reference object.

For example, in a case in which the user presses a key of a keyboard, the HMD may detect the keyboard as a reference object. Also, in a case in which the user performs a writing operation using a pen, the HMD may detect the pen as a reference object. Also, in a case in which the user touches a touch sensitive display, the HMD may detect a device including the touch sensitive display as a reference object. Also, in a case in which the user controls a control button of an electronic instrument, the HMD may detect the electronic instrument as a reference object.

Also, the HMD may detect a point of the reference object, on which the event has been generated, as a reference point. In this case, the HMD may perform eye gaze calibration using the position of the reference point instead of the position of the reference object such that the eye gaze calibration is accurately performed.

For example, in a case in which the reference object is a keyboard input device, the HMD may detect a key of the keyboard pressed by the user as a reference point. Also, in a case in which the reference object is a pen, the HMD may detect the tip of the pen gripped by the user as a reference point. Also, in a case in which the reference object is a device including a touch sensitive display, the HMD may detect a soft button of the touch sensitive display, which the user touches, as a reference object. Also, in a case in which the reference object is an electronic instrument, the HMD may detect a control button of the electronic instrument controlled by the user as a reference object.

The HMD may perform eye gaze calibration based on at least one of the detected reference object and the detected reference point.

Figure 13:
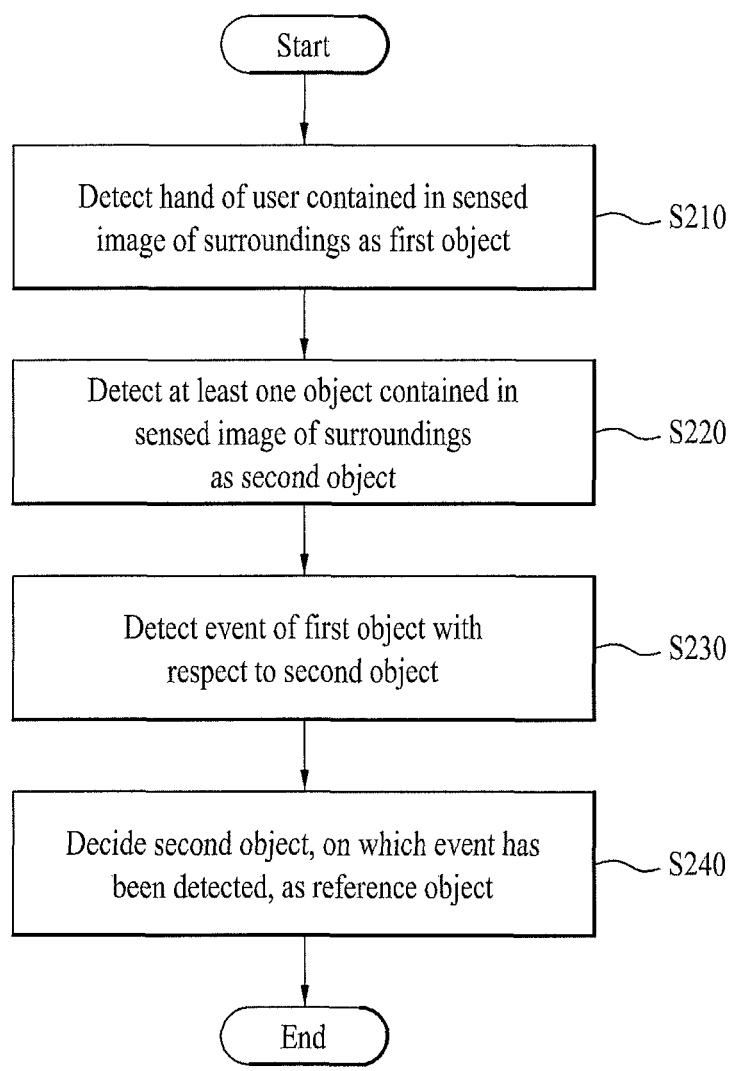
FIG. 13 is a flowchart showing a method of deciding a reference object according to another embodiment of the present specification.

FIG. 13 is a flowchart showing a method of deciding a reference object according to another embodiment of the present specification. The HMD may detect a hand of a user contained in a sensed image of the surroundings as a first object (S210). The HMD may detect the hand of the user before detecting a real object. As previously described with reference to FIGS. 1 to 4, the HMD may detect the hand of the user from the image of the surroundings using the image processing unit. Also, the HMD may detect the detected hand of the user as a first object. The HMD may distinguish between the hand of the user and a hand of another person using at least one of a shape of the hand of the user and a gesture of the hand of the user. For example, when the HMD has detected a V-shaped hand gesture of the user, the HMD may detect the hand of the user as a first object. In another embodiment, the HMD may distinguish between the hand of the user and a hand of another person based on the lines of the palm of the user or the shape of a vein on the back of the hand of the user.

The HMD may detect at least one object contained in the sensed image of the surroundings as a second object (S220). As previously described with reference to FIGS. 1 to 4, the HMD may extract at least one real object from the image of the surroundings using the image processing unit. The HMD may detect the extracted at least one real object as a second object. Alternatively, the HMD may detect two or more real objects as second objects.

The HMD may detect an event of the first object with respect to the second object (S230). As previously described with reference to FIGS. 1 to 4, the HMD may detect an operation of controlling the real object detected as the second object using the hand of the user detected as the first object through the image processing unit. The HMD may detect the above operation as an event of the first object with respect to the second object.

For example, the HMD may detect the tip of a finger of the user as a first object and an external device as a second object. In a case in which the second object is a keyboard input device, the HMD may detect an operation of pressing a key of the keyboard as an event. Also, in a case in which the second object is a pen, the HMD may detect a writing operation using a pen as an event. Also, in a case in which the second object is a device including a touch sensitive display, the HMD may detect an operation of touching the touch sensitive display as an event. Also, in a case in which the second object is an electronic instrument, the HMD may detect an operation of controlling a control button of the electronic instrument as an event. The control button of the electronic instrument may include at least one selected from among a power button, volume control buttons, and channel control buttons.

The HMD may decide the second object, on which the event has been detected, as a reference object (S240). As previously described with reference to FIGS. 1 to 4, the HMD may decide the second object, on which the event has been detected, as a reference object using the image processing unit. That is, the HMD may detect one of the detected second objects, i.e. the second object, on which the event has been detected, as a reference object.

For example, in a case in which the user presses a key of a keyboard, the HMD may detect the keyboard as a reference object. Also, in a case in which the user performs a writing operation using a pen, the HMD may detect the pen as a reference object. Also, in a case in which the user touches a touch sensitive display, the HMD may detect a device including the touch sensitive display as a reference object. Also, in a case in which the user controls a control button of an electronic instrument, the HMD may detect the electronic instrument as a reference object.

Also, the HMD may detect a point of the reference object, on which the event has been generated, as a reference point. In this case, the HMD may perform eye gaze calibration using the position of the reference point instead of the position of the reference object such that the eye gaze calibration is accurately performed.

For example, in a case in which the reference object is a keyboard input device, the HMD may detect a key of the keyboard pressed by the user as a reference point. Also, in a case in which the reference object is a pen, the HMD may detect the tip of the pen gripped by the user as a reference point. Also, in a case in which the reference object is a device including a touch sensitive display, the HMD may detect a soft button of the touch sensitive display, which the user touches, as a reference object. Also, in a case in which the reference object is an electronic instrument, the HMD may detect a control button of the electronic instrument controlled by the user as a reference object.

The HMD may perform eye gaze calibration based on at least one of the detected reference object and the detected reference point. The HMD may move the position of an image or a virtual object to be displayed according to a result of the eye gaze calibration.

Figure 14:
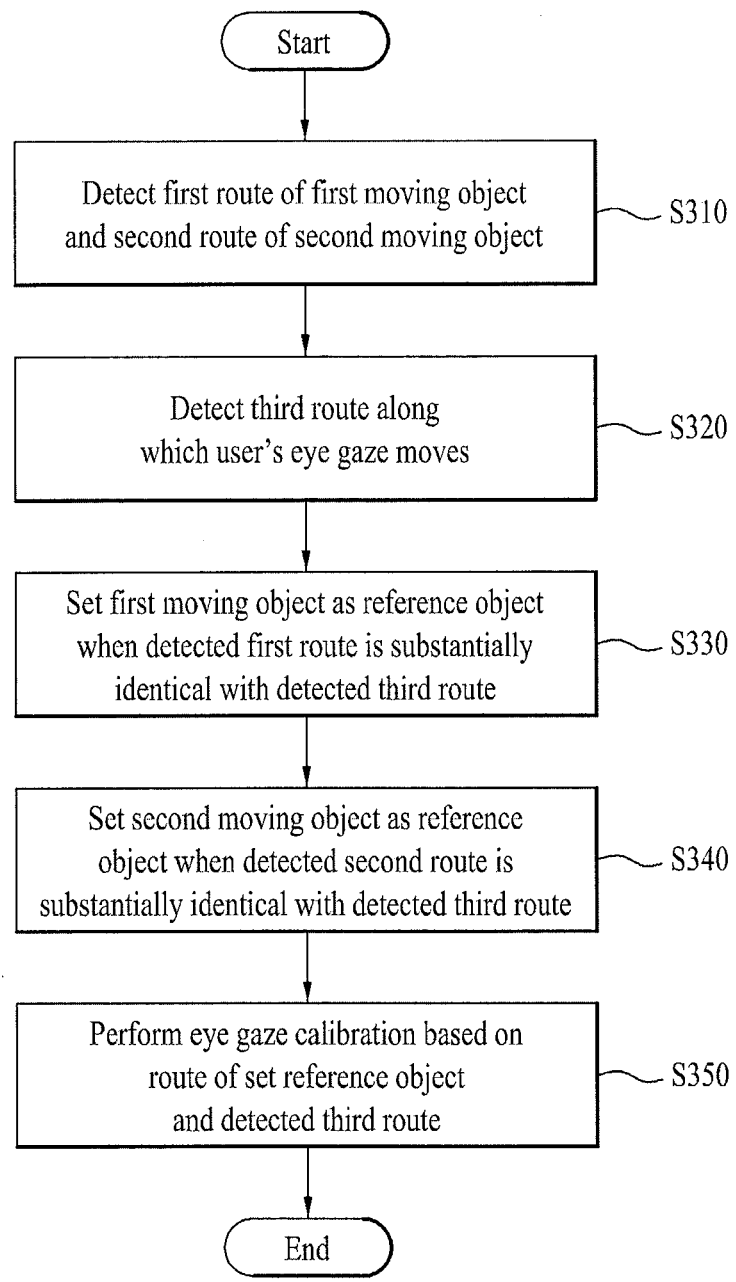
FIG. 14 is a flowchart showing a method of deciding a reference object according to a further embodiment of the present specification.

FIG. 14 is a flowchart showing a method of deciding a reference object according to a further embodiment of the present specification. The HMD may detect a first route of a first moving object and a second route of a second moving object in front of the HMD (S310). As previously described with reference to FIG. 7, the HMD may detect a route of a moving object having mobility. When a plurality of moving objects is detected through a camera unit, the HMD may include only moving objects satisfying at least one selected from among a velocity condition, a size condition, a moving direction condition, and a color condition in a reference object candidate group. The camera unit may detect an image having the same range as a visual field of the user. In a case in which the first moving object and the second moving object satisfy at least one of the above conditions, the HMD may include the first moving object and the second moving object in the reference object candidate group. In addition, the HMD may detect a first route of the first moving object including a moving direction and displacement of the first moving object and a second route of the second moving object including a moving direction and displacement of the second moving object.

The HMD may detect a third route along which user's eye gaze moves (S320). The HMD may detect a user's eye gaze direction based on movement of a pupil of the user. The HMD may track user's eye gaze moving over time to detect the third route, along which the user's eye gaze moves. The HMD may detect the third route of the user's eye gaze using an eye gaze detection unit. The HMD may compare the detected first route and the detected second route with the third route.

In a case in which the detected first route is substantially identical with the detected third route, the HMD may set the first moving object as a reference object (S330). The HMD may compare the direction, velocity, and movement distance of the first moving object moving along the first route with the direction, velocity, and movement distance of the user's eye gaze to determine whether the first route is substantially identical with the third route. Even in a case in which the first route of the reference object and the third route of the user's eye gaze are substantially identical with each other by a first rate or more in addition to a case in which the first route and the third route completely identical with each other, the HMD may determine that the first route is substantially identical with the third route. Only when the first route and the third route identical with each other by the first rate or more, the HMD may perform the following eye gaze calibration.

In a case in which the detected second route is substantially identical with the detected third route, the HMD may set the second moving object as a reference object (S340). The HMD may compare the direction, velocity, and movement distance of the second moving object moving along the second route with the direction, velocity, and movement distance of the user's eye gaze to determine whether the second route is substantially identical with the third route. Even in a case in which the second route of the reference object and the third route of the user's eye gaze identical with each other by the first rate or more in addition to a case in which the second route and the third route completely identical with each other, the HMD may determine that the second route is substantially identical with the third route. Only when the second route and the third route identical with each other by the first rate or more, the HMD may perform the following eye gaze calibration.

The HMD may perform eye gaze calibration based on the route of the set reference object and the detected third route (S350). In a case in which the wearing position of the HMD is changed or a case in which the change of user's eye gazes exceeds a threshold level, the HMD may perform eye gaze calibration. The HMD may move the position of a virtual object or visual information which has been displayed according to a result of the eye gaze calibration. In addition, the HMD may display a virtual object or visual information which has not yet been displayed at a position acquired by reflecting the result of the eye gaze calibration.

FIG. 15 is a view showing a focus control method of an HMD using a moving object according to an embodiment of the present specification.

As previously described, the HMD may detect the reference object and the user's eye gaze direction. At this time, the HMD ma control the focus of the camera unit 101 based on the reference object and the user's eye gaze direction.

For example, referring to FIG. 15, the HMD may set at least one selected from between a first moving object 151 and a second moving object 152 as a reference object. At this time, for example, in a case in which the first moving object 151 and the second moving object 152 satisfy at least one selected from among the velocity condition, the size condition, the moving direction condition, and the color condition as described above, the HMD may include the first moving object 151 and the second moving object 152 in a reference object candidate group and decide a reference object from among the moving objects included in the reference object candidate group. In addition, as previously described, the HMD may decide a user's eye gaze using the eye gaze detection unit 22. The HMD may detect a third route along which the user's eye gaze moves. In addition, the HMD may compare the first route and the second route detected using the image processing unit with the third route along which the user's eye gaze moves. At this time, in a case in which a moving object having a route substantially coinciding with the third route is present, the HMD may determine that the user gazes at the corresponding moving object. Identification between the two routes may include a case in which the two routes are substantially identical with each other in terms of a direction and a moving rate in addition to a case in which the two routes are completely identical with each other. That is, the HMD may decide the first moving object, moving along the first route substantially coinciding with the third route, as a reference object.

Figure 15A:
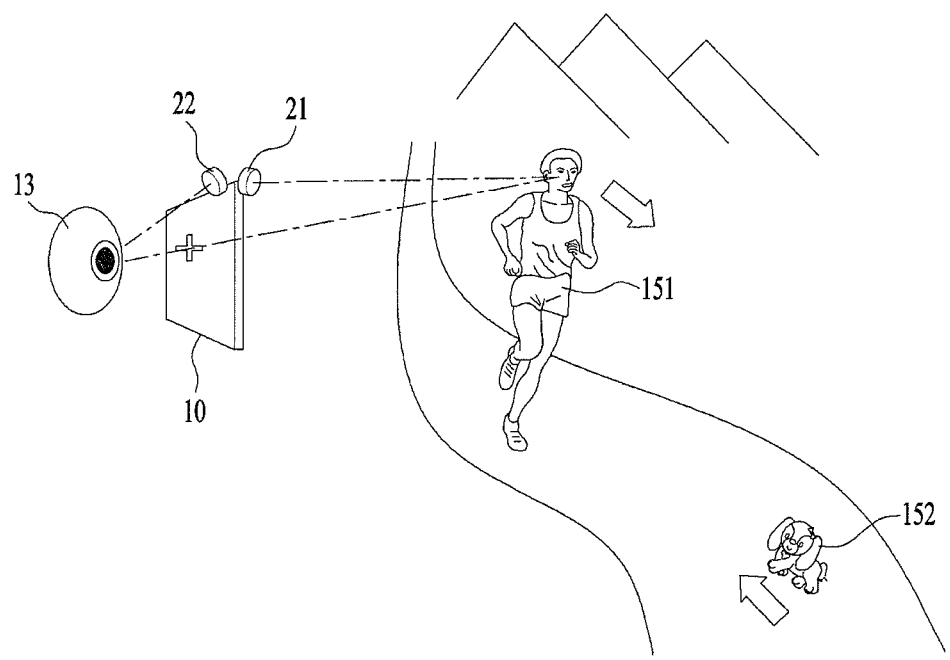
FIGS. 15A-15F are views showing a focus control method of an HMD using a moving object according to an embodiment of the present specification.
Figure 15B:
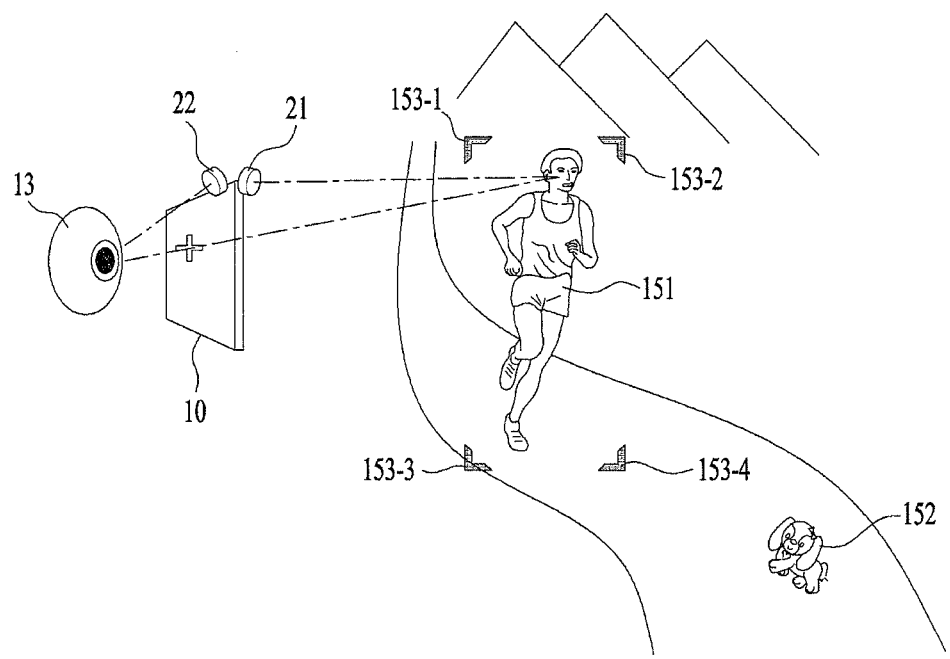
Figure 15C:
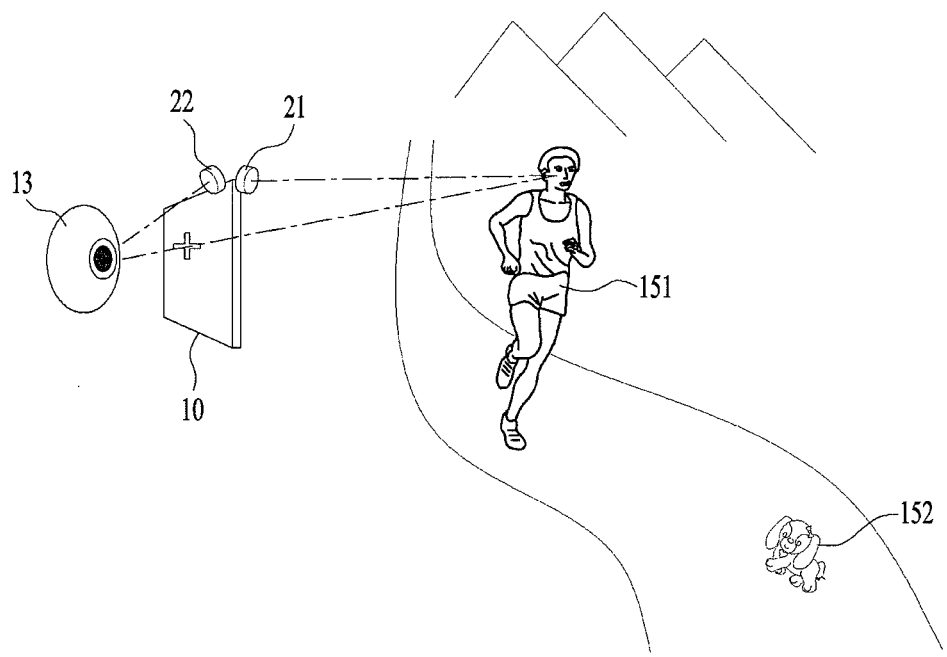

More specifically, as shown in FIG. 15(a), the HMD may detect that the first route along which the first moving object moves is identical with the third route along which the user's eye gaze moves. That is, the HMD may detect that the user's eye gaze moves in the moving direction of the first moving object using the eye gaze detection unit 22. Upon detecting that the first route and the third route are identical with each other, the HMD may set the focus of the camera unit 101 on the first moving object 151. At this time, for example, the HMD may sense an image focused on the first moving object 151 using the camera unit 101. That is, the HMD may set a focus on the first moving object 151 and capture an image using the camera unit 101. In addition, for example, the HMD may display the image sensed by the camera unit 101 as visual information using the display unit 104. The HMD may display preview information regarding the captured image as visual information using the display unit 104. At this time, as previously described, the HMD may display the visual information between an eye of the user and the reference object and the reference object. That is, the reference object is a real object and visual information regarding the reference object may be displayed using a see-through type display unit. At this time, for example, a focusing indicator may be displayed as a virtual object. At this time, the virtual object may be a graphical user interface provided to the user by the display unit 105. At this time, the display unit 105 may display the virtual object, i.e. the focusing indicator, based on the position of the reference object using augmented reality technology. In addition, for example, the HMD may measure the distance to the detected reference object using the distance measurement unit 106.

The HMD may decide a display depth of the virtual object, i.e. the focusing indicator, in response to the measured distance to the reference object. At this time, for example, the HMD may set depth of an augmented reality message such that the depth of the augmented reality message is equal to depth of the reference point. As a result, the HMD device may display an augmented reality message such that the augmented reality message is located in the same plane as the reference point at the same depth as the reference point. However, embodiments of the present specification are not limited thereto.

In a case in which the HMD displays the visual information, the HMD may further display focusing indicators 153-1, 153-2, 153-3, and 153-4. At this time, the focusing indicators 153-1, 153-2, 153-3, and 153-4 may indicate a reference object a focus of which has been set by the camera unit 101. In addition, for example, the focusing indicators 153-1, 153-2, 153-3, and 153-4 may indicate a region on which a focus has been set as the region including the reference object. In addition, for example, the HMD may capture only a region set by the focusing indicators 153-1, 153-2, 153-3, and 153-4 as an image using the camera unit 101. That is, the focusing indicators 153-1, 153-2, 153-3, and 153-4 may be indicators indicating a region on which a focus has been set. In addition, the focusing indicators 153-1, 153-2, 153-3, and 153-4 may indicate a region on which a focus has been set and which is captured as an image. More specifically, referring to FIG. 15(b), the HMD may detect that the first route of the first moving object 151 is substantially identical with the third route of the user's eye gaze. At this time, the HMD may set the focusing indicators 153-1, 153-2, 153-3, and 153-4, indicating that a focus has been set on the first moving object 151, on a region including the first moving object 151. As a result, the HMD may confirm an object or a region on which a focus is adjusted.

In addition, the HMD may display first visual information corresponding to the first moving object 151 and second visual information corresponding to the second moving object 152. At this time, the HMD may display the first visual information corresponding to the first moving object 151 on which the focus has been set such that the first visual information has a different display property from the second visual information. At this time, the display property may include at least one selected from among sharpness, resolution, and brightness. That is, the HMD may display the object on which the focus has been set such that the object is distinguished from a surrounding region. More specifically, referring to FIG. 15(c), the HMD may display the first moving object 151 decided as the reference object such that the first moving object 151 is more vivid than the second moving object 152. In addition, the HMD may set sharpness of the second moving object 152 and a surrounding image such that the sharpness of the second moving object 152 and the surrounding image is lower than that of the first moving object 151. That is, the HMD may adjust sharpness to indicate a focused object. In addition, for example, the HMD may adjust at least one selected from between brightness and resolution of the reference object. As a result, the HMD may indicate the focused object.

In addition, for example, the HMD may capture the visual information displayed on the display unit as an image using the camera unit 101. At this time, the HMD may capture the image while maintaining the above-defined display property.

Figure 15D:
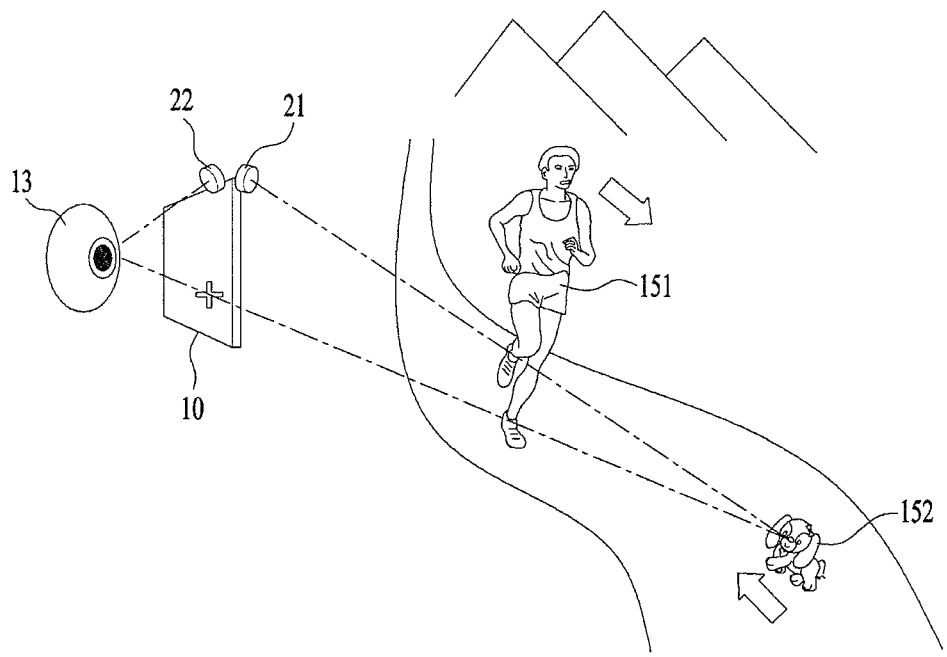
Figure 15E:
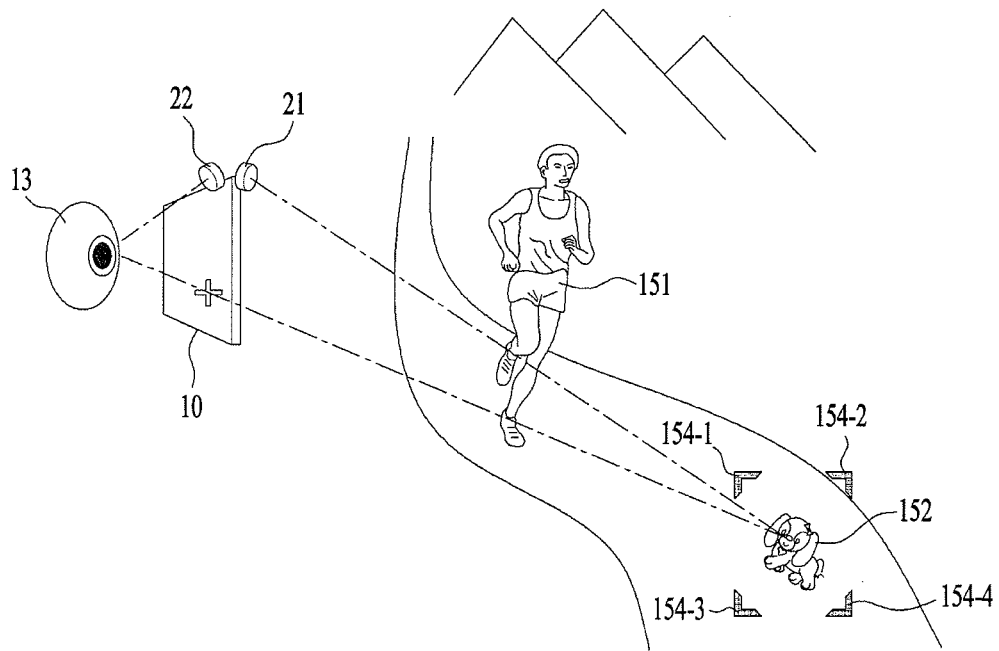
Figure 15F:
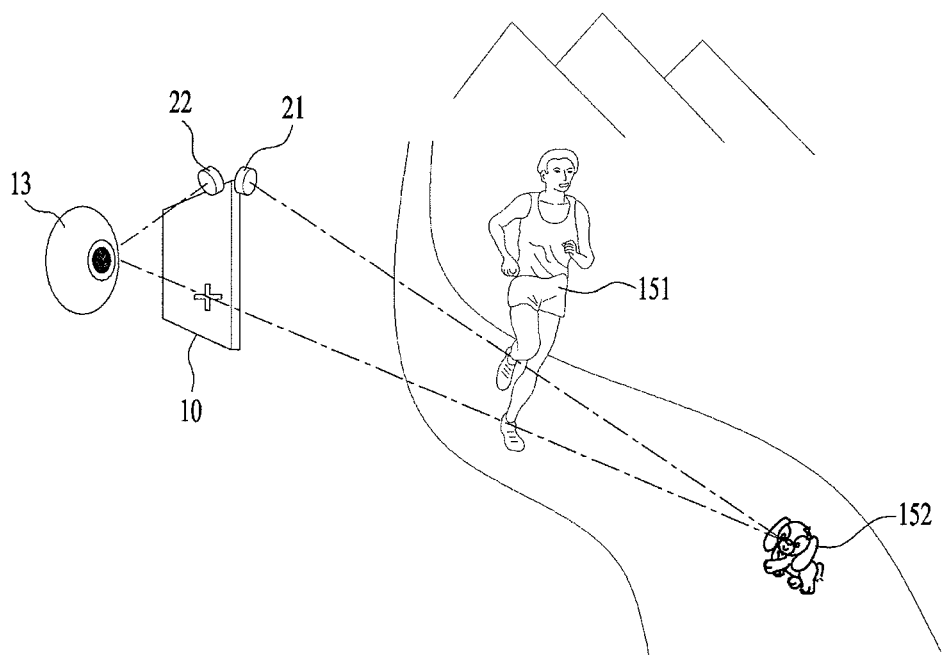

Referring to FIGS. 15(d) to 15(f), the HMD may detect that that the second route of the second moving object 152 is substantially identical with the third route of the user's eye gaze. At this time, as previously described, identification between the two routes may include a case in which the two routes are substantially identical with each other in terms of a direction and a moving rate in addition to a case in which the two routes are completely identical with each other. That is, the HMD may decide the second moving object, moving along the second route substantially coinciding with the third route, as a reference object. In addition, the HMD may capture an image focused on the second moving object 152 using the camera unit 101. In a case in which the user captures an image containing moving objects using the HMD, therefore, the user may set one of the moving object on which a focus will be set through the user's eye gaze. In addition, the HMD may display focusing indicators 154-1, 154-2, 154-3, and 154-4 indicating the second moving object 152 set as the reference object. In addition, the HMD may display the reference object on which the focus has been set with the display property of the reference object being changed in the same manner as in the above description.

Figure 16:
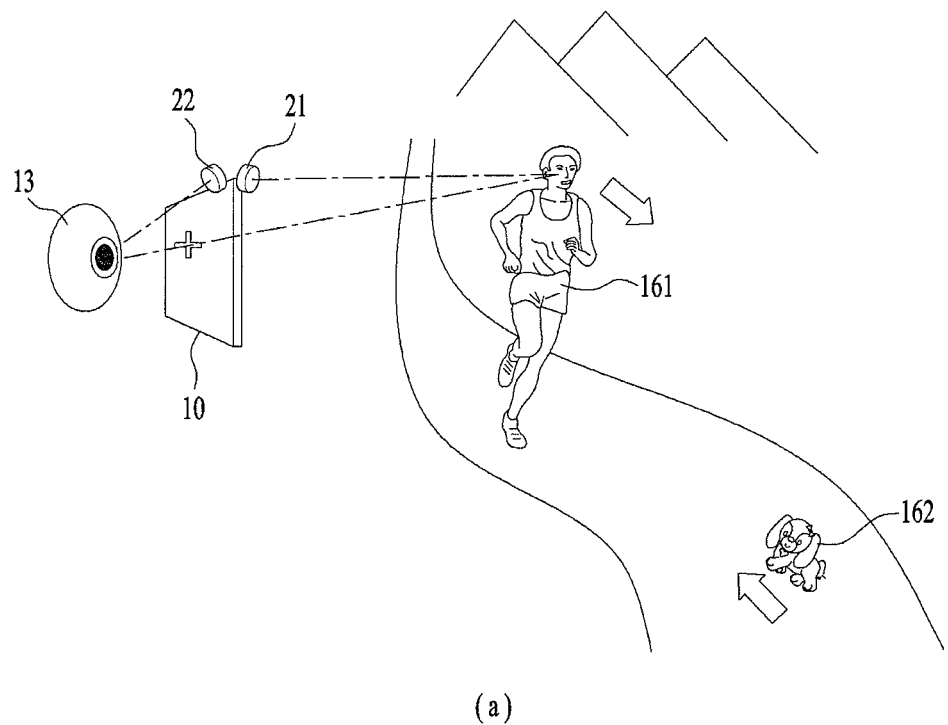
FIG. 16 is a view showing a method of an HMD controlling a focus of a portion of a moving object according to an embodiment of the present specification.
Figure 16:
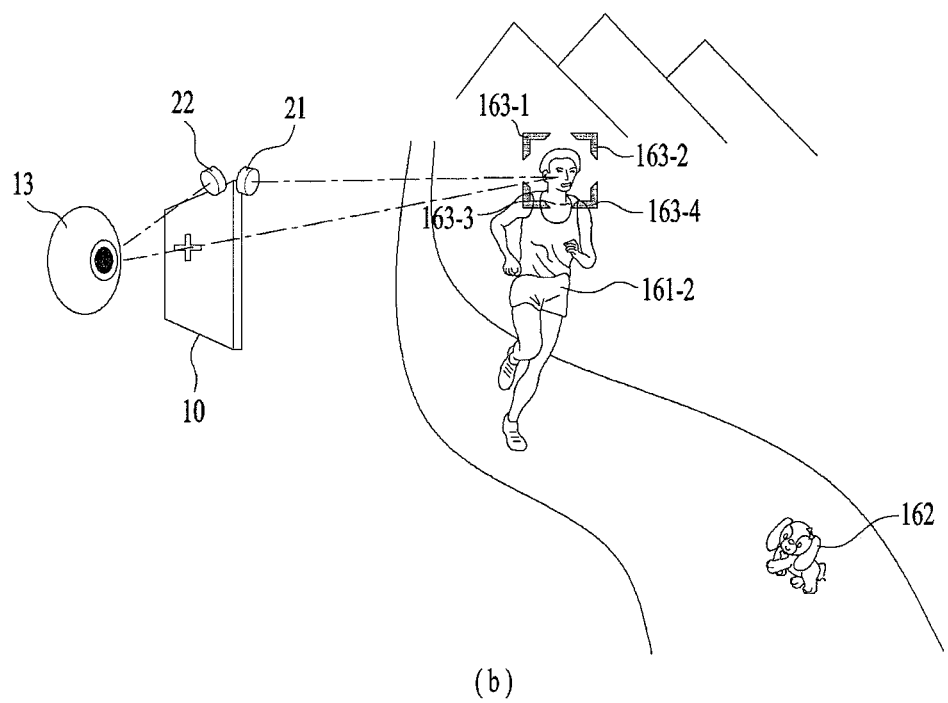

FIG. 16 is a view showing a method of an HMD controlling a focus of a portion of a moving object according to an embodiment of the present specification. In addition, the HMD may detect a reference point, which is a portion of the reference object. At this time, the HMD may use the position of the reference point instead of the position of the reference object in controlling a focus to set a correct focusing region. The HMD may detect a user's eye gaze direction in which the user gazes at the detected reference object using the eye gaze detection unit. The reference point may be a portion of the reference object. In addition, for example, the reference point may mean a region of the reference object that the user's eye gaze reaches within a threshold range. In addition, for example, the HMD may decide a portion of the reference object as a reference point according to point priority information. For example, in a case in which a reference object is an animal, the face of the animal may be decided as a reference point. Particularly, in a case in which a reference object is a human being, the face of the human being may be decided as a reference point. On the other hand, in a case in which a reference object is a car, the number plate, emblem, or headlight of the car may be decided as a reference point. In addition, in a case in which a place where eye gaze calibration is performed is dark, a bright portion of a reference object may be decided as a reference point. That is, the reference point may be decided by the HMD in consideration of the object property. However, embodiments of the present specification are not limited thereto. The HMD may control a focus of the camera unit based on the reference point. At this time, the MID may focus only a region set by the reference point. More specifically, referring to FIGS. 16(*a*) and 16(*b*), in a case in which a reference object is a human being, the HMD may decide the face of the human being as a reference point. At this time, the HMD may adjust the focus of the camera unit 101 on the face of the human being. At this time, for example, the HMD may set a focus on the face of the human being and capture an image containing the human being and a surrounding image using the camera unit 101. In addition, for example, the HMD may set a focus on the face of the human being and capture an image containing only the human being excluding a surrounding image using the camera unit 101. That is, in a case in which the HMD controls the focus based on the reference point, the HMD may distinguish between a region on which a focus is set and a region captured as an image. As a result, the user may set a region on which a focus is set and a region captured as an image using the HMD such that the region on which the focus is set is distinguished from the region captured as the image.

Figure 17:
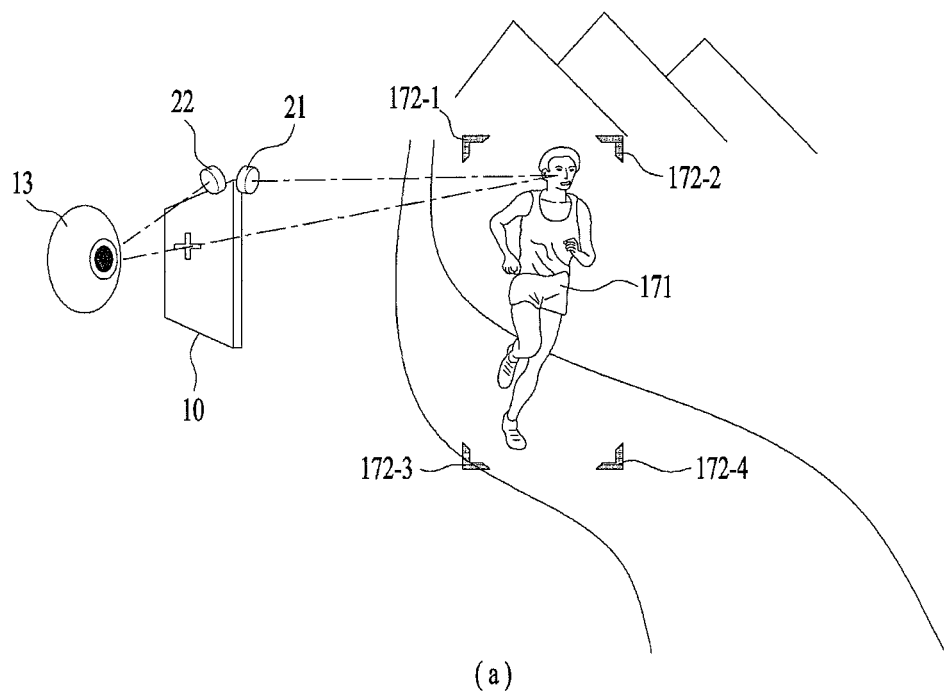
FIG. 17 is a view showing a method of an HMD continuously controlling a focus of a moving object according to an embodiment of the present specification.
Figure 17:
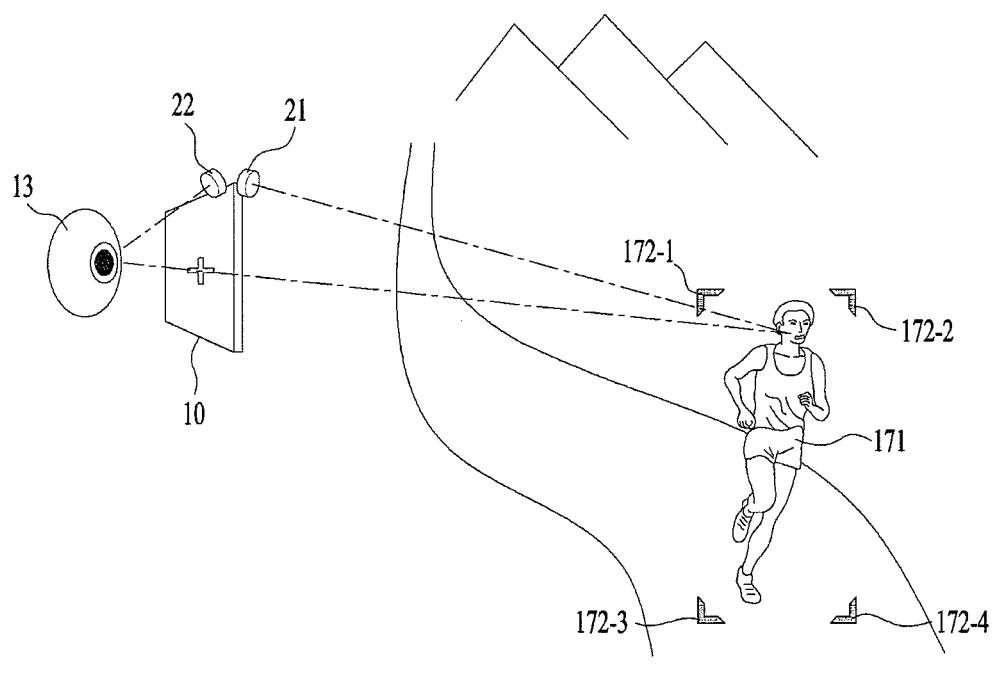

FIG. 17 is a view showing a method of an HMD continuously controlling a focus of a moving object according to an embodiment of the present specification. The HMD may detect a route of a reference object and detect whether the route of a reference object is substantially identical with a user's eye gaze. At this time, the HMD may detect the position of the reference object and a user's eye gaze direction and control a focus of the camera unit 101 using the same. More specifically, the reference object may move from a first position to a second position. The HMD may detect a user's first eye gaze direction when the reference object is at the first position. In addition, the HMD may detect a user's second eye gaze direction when the reference object is at the second position. The HMD may detect movement of the reference object and movement of the user's eye gaze and control a focus based on the first position, the second position, the first eye gaze direction corresponding to the first position, and the second eye gaze direction corresponding to the second position. At this time, for example, upon detecting that the moving direction of the reference object and the moving direction of the user's eye gaze are opposite to each other, the HMD may detect that the first route of the reference object is substantially identical with the third route of the user's eye gaze. More specifically, the HMD may be located between the reference object and the user. Consequently, left and right directions of the reference object detected by the HMD may be set to be opposite to those of the user's eye gaze detected by the HMD. That is, the HMD may convert the left and right directions of the HMD and detect whether the first route of the reference object is substantially identical with the third route of the user's eye gaze. In addition, for example, in a case in which the reference object moves, the HMD may continuously control the focus of the camera unit 101 based on the user's eye gaze direction. More specifically, referring to FIGS. 17(*a*) and 17(*b*), a first moving object 171 may be a human being. At this time, the first moving object 171 may be an object that is moving. In a case in which the first moving object 171 moves from a first position to a second position, the HMD may continuously change the focus of the camera unit 101 based on the moved position of the first moving object 171. That is, the HMD may change the set focus based on the first moving object 171 to continuously maintain focusing of the first moving object 171. At this time, for example, the HMD may change the focus at reference time intervals. At this time, the reference time may be very short.

Figure 18:
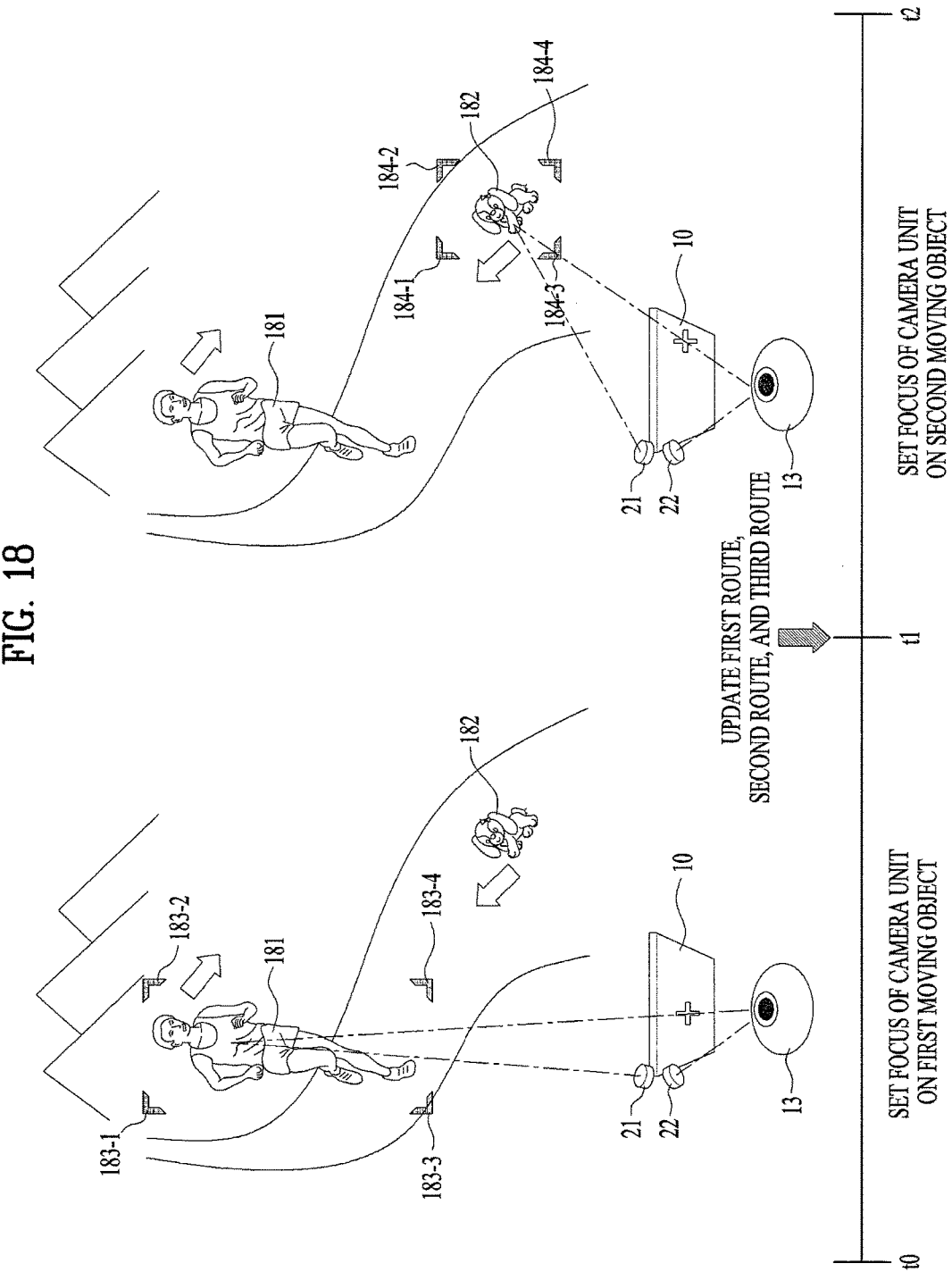
FIG. 18 is a view showing a method of an HMD controlling a focus of a moving object based on a predetermined cycle according to an embodiment of the present specification.

FIG. 18 is a view showing a method of an HMD controlling a focus of a moving object based on a predetermined cycle according to an embodiment of the present specification. In a case in which the route of the reference object is substantially identical with the route of the user's eye gaze, the HMD may set the focus of the camera unit 101 on the reference object. At this time, the HMD may detect the route of the reference object and the route of the user's eye gaze based on a predetermined cycle. More specifically, the HMD may detect the route of the reference object and the route of the user's eye gaze. At this time, for example, in a case in which the route of the reference object is substantially identical with the route of the user's eye gaze, the HMD may set the focus of the camera unit 101 on the reference object. After that, the HMD may maintain the focus set on the reference object for a predetermined period of time. At this time, for example, the HMD may maintain the focus set on the reference object for the predetermined period of time even when the route of the user's eye gaze is changed. That is, the HMD may set the focus on the reference object and then maintain the focus set on the reference object for the predetermined period of time irrespective of the position of the user's eye gaze. The HMD may redetect a first rout of a first moving object 181, a second route of a second moving object 182, and a third route of a user's eye gaze after the lapse of the predetermined period of time. The HMD may reset an object having substantially the same route as the third route of the user's eye gaze as a reference object. As a result, the HMD may update an object focused per predetermined cycle. More specifically, referring to FIG. 18, the HMD may detect the route of the object and the route of the user's eye gaze at t0. At this time, the HMD may detect that the first rout of the first moving object 181 is substantially identical with the third route of the user's eye gaze. The HMD may set the focus of the camera unit 101 on the first moving object. After that, the HMD may set the focus of the camera unit 101 on the first moving object 181 irrespective of the route of the user's eye gaze until t1. After that, the HMD may redetect the first rout of the first moving object 181, the second route of the second moving object 182, and the third route of the user's eye gaze at t1. At this time, the HMD may detect that the second route of the second moving object 182 is substantially identical with the third route of the user's eye gaze. The HMD may set the focus of the camera unit 101 on the second moving object. After that, the HMD may set the focus of the camera unit 101 on the second moving object 182 irrespective of the route of the user's eye gaze until t2. As a result, the HMD may set a focus on a specific reference object and then maintain the focus for a predetermined period of time.

FIG. 19 is a flowchart showing a method of deciding a reference object according to an embodiment of the present specification. The HMD may sense an image of the surrounding in front of the HMD (S410). As previously described with reference to FIG. 10, the HMD may sense an image having a range corresponding to a visual field of a user.

Next, the HMD may detect a reference object from the sensed image of the surroundings (S420). As previously described with reference to FIGS. 1 to 4, the HMD may distinguish at least one real object contained in the sensed image of the surroundings on a per object unit basis. The HMD may detect a reference object from the at least one real object distinguished on the per object unit basis. In addition, the HMD may detect a reference point, which is a portion of the reference object. In this case, the HMD may use the position of the reference point instead of the position of the reference object in focusing to accurately set the focus of the camera unit 101.

Next, the HMD may detect a user's eye gaze direction in which the user gazes at the detected reference object (S430). As previously described with reference to FIG. 1, the HMD may detect the position of a pupil of a user wearing the HMD to decide a user's eye gaze direction. The HMD may correct the detected user's eye gaze direction based on at least one selected from between the relative position between the HMD and the pupil of the user and the distance between the HMD and the pupil of the user.

Next, the HMD may set the focus of the camera unit on the reference object based on the detected reference object and the detected user's eye gaze direction (S440). As previously described with reference to FIGS. 10 and 15, the HMD may set the focus of the camera unit on the reference object. At this time, for example, the HMD may set the reference object based on at least one selected from among the velocity condition, the size condition, the moving direction condition, and the color condition. The HMD may set the focus of the camera unit on the set reference object. The focus, which is a converging spot of light, may be decided based on optical properties of a lens or a mirror. On the other hand, the focus may mean a converging spot of light reflected by a subject, passing through a lens, and incident upon a focus plane of a film to form an image of the subject.

FIG. 20 is a flowchart showing a method of deciding a reference object according to another embodiment of the present specification.

The HMD may detect a first route of a first moving object and a second route of a second moving object (S510). As previously described with reference to FIG. 7, the HMD may detect a route of a moving object having mobility. In a case in which a plurality of moving objects is detected by the camera unit, the HMD may include only moving objects satisfying at least one selected from among the velocity condition, the size condition, the moving direction condition, and the color condition in a reference object candidate group. The camera unit may detect an image having the same range as a visual field of a user. In a case in which the first moving object and the second moving object satisfy at least one selected from among the above-defined conditions, the HMD may include the first moving object and the second moving object in the reference object candidate group. In addition, the HMD may detect a first route including a moving direction and displacement of the first moving object and a second route including a moving direction and displacement of the second moving object.

Next, the HMD may detect a third route along which a user's eye gaze moves (S520). As previously described with reference to FIG. 7, the HMD may detect a user's eye gaze direction based on movement of a pupil of the user. The HMD may track a user's eye gaze moving over time to detect the third route, along which the user's eye gaze moves. The HMD may detect the third route of the user's eye gaze using the eye gaze detection unit. The HMD may compare the detected first route and the detected second route with the third route.

Next, in a case in which the detected first route is identical with the detected third route, the HMD may set the first moving object as a reference object (S530). As previously described with reference to FIG. 15, the HMD may compare the direction, velocity, and movement distance of the first moving object moving along the first route with the direction, velocity, and movement distance of the user's eye gaze to determine whether the first route is identical with the third route. Even in a case in which the first route of the reference object and the third route of the user's eye gaze are identical with each other by a first rate or more in addition to a case in which the first route and the third route completely identical with each other, the HMD may determine that the first route is identical with the third route.

Next, in a case in which the detected second route is identical with the detected third route, the HMD may set the second moving object as a reference object (S540). As previously described with reference to FIG. 15, the HMD may compare the direction, velocity, and movement distance of the second moving object moving along the second route with the direction, velocity, and movement distance of the user's eye gaze to determine whether the second route is identical with the third route. Even in a case in which the second route of the reference object and the third route of the user's eye gaze identical with each other by the first rate or more in addition to a case in which the second route and the third route completely identical with each other, the HMD may determine that the second route is identical with the third route.

Next, the HMD may set the focus of the camera unit on the reference object based on the route of the set reference object and the detected third route (S550). As previously described with reference to FIGS. 10 and 15, the HMD may set the focus of the camera unit on the set reference object. The focus, which is a converging spot of light, may be decided based on optical properties of a lens or a mirror. On the other hand, the focus may mean a converging spot of light reflected by a subject, passing through a lens, and incident upon a focus plane of a film to form an image of the subject. The HMD may set a focus on a reference object contained in a region captured as an image and sense the image.

According to embodiments of the present specification, it is possible for an HMD to perform eye gaze calibration while a user uses the HMD.

Also, according to embodiments of the present specification, it is possible for an HMD to use a real object contained in the surroundings as a reference point for eye gaze calibration.

According to embodiments of the present specification, it is possible for an HMD to recognize a portion of the body of a user and to use the recognized portion of the body of the user as a reference point for eye gaze calibration.

According to embodiments of the present specification, it is possible for an HMD to use a hand of a user as a reference point for eye gaze calibration.

According to embodiments of the present specification, it is possible for an HMD to detect an event on a real object and to use the real object as a reference point for eye gaze calibration.

According to embodiments of the present specification, it is possible for an HMD to detect a user's eye gaze direction and to use the detected user's eye gaze direction in eye gaze calibration.

According to embodiments of the present specification, it is possible for an HMD to measure the distance from the HMD to a reference point and to decide depth of a virtual object displayed on the HMD based on the measured distance from the HMD to the reference point.

In addition, according to embodiments of the present specification, it is possible for an HMD to set a focus of a camera unit on a reference object.

In addition, according to embodiments of the present specification, it is possible for an HMD to recognize a portion of the body of a user and to set a focus of a camera unit on a reference point of a reference object.

In addition, according to embodiments of the present specification, it is possible for an HMD to detect an event on a real object and to use the real object as a reference point on which a focus of a camera unit is set.

In addition, according to embodiments of the present specification, it is possible for an HMD to detect a user's eye gaze direction and to set a focus of a camera unit.

It will be apparent to those skilled in the art that various modifications and variations can, be made in the present specification without departing from the spirit or scope of the specifications. Thus, it is intended that the present specification covers the modifications and variations of this specification provided they come within the scope of the appended claims and their equivalents.

What is claimed is:

1. A head mounted display (HMD) comprising:
a camera unit configured to detect a first route of a first moving object and a second route of a second moving object in front of the HMD;
an eye gaze detection unit configured to detect a third route along which a user's eye gaze moves;
a display unit configured to display visual information; and
a controller configured to:
control a focus of the camera unit based on a route of a reference object and the detected third route; and
display the visual information between an eye of the user and the reference object,
wherein the controller is further configured to:
select the reference object from a plurality of real moving objects including the first moving object and the second moving object, wherein the reference object is selected by comparing the third route of the eye gaze with each route of the plurality of real moving objects, wherein the plurality of real moving objects are not images displayed by the display unit,
if the detected first route of the first moving object is substantially identical with the detected third route, set the first moving object as the reference object,
if the detected second route of the second moving object is substantially identical with the detected third route, set the second moving object as the reference object, and
set the focus of the camera unit on the set reference object.

2. The HMD according to claim 1, wherein the controller is further configured to display the visual information based on a display property,
wherein first visual information corresponding to the reference object on which the focus of the camera unit is set has a display property different from second visual information corresponding to an object on which the focus of the camera unit is not set.

3. The HMD according to claim 2, wherein the display property comprises at least one selected from among sharpness, resolution, and brightness.

4. The HMD according to claim 1, wherein the controller is further configured to:
display first visual information corresponding to the reference object on which the focus of the camera unit is set with first sharpness and
display second visual information corresponding to an object on which the focus of the camera unit is not set with second sharpness,
wherein the first sharpness is higher than the second sharpness.

5. The HMD according to claim 1, wherein the controller is further configured to display a focusing indicator using the display unit,
wherein the focusing indicator indicates the reference object on which the focus of the camera unit is set.

6. The HMD according to claim 5, wherein the controller is further configured to display the focusing indicator as a virtual object,
wherein the virtual object is a graphical user interface provided to the user through the display unit.

7. The HMD according to claim 6, wherein the display unit displays the focusing indicator as the virtual object based on a position of the reference object using augmented reality technology.

8. The HMD according to claim 7, further comprising:
a distance measurement unit configured to measure a first distance from the HMD to the detected reference object,
wherein the controller is further configured to decide a display depth of the focusing indicator as the virtual object in response to the measured first distance.

9. The HMD according to claim 1, wherein the controller is further configured to:
if a plurality of moving objects having the same route is detected by the camera unit, set the reference object from among the detected moving objects according to object priority information.

10. The HMD according to claim 1, wherein the controller is further configured to:
set the route of the reference object as a route of a reference point located on the detected reference object, and
perform auto focusing based on the route of the reference point,
wherein the reference point is a portion of the reference object.

11. The HMD according to claim 10, wherein the reference point is set as a portion of the reference object according to point priority information.

12. The HMD according to claim 10, wherein the controller is further configured to:
if the focus of the camera unit based on the route of the reference point is controlled, set the focus of the camera unit on a portion of the reference object set as the reference point.

13. The HMD according to claim 1, wherein the controller is further configured to:
if a position of the reference object moves from a first position to a second position, detect a user's first eye gaze direction when the reference object is located at the first position, and a user's second eye gaze direction when the reference object is located at the second position, and
control the focus of the camera unit based on the first position, the second position, the first eye gaze direction, and the second eye gaze direction.

14. The HMD according to claim 1, wherein the controller is further configured to:
if a position of the reference object moves from a first position to a second position, continuously control the focus of the camera unit based on the position of the reference object and the user's eye gaze moving along the reference object.

15. The HMD according to claim 1, wherein the controller is further configured to:
if a plurality of moving objects is detected by the camera unit, put at least one of the moving objects satisfying at least one selected from among a velocity condition, a size condition, a moving direction condition, and a color condition in a reference object candidate group.

16. The HMD according to claim 1, wherein
the eye gaze detection unit detects a user's eye gaze direction based on movement of a pupil of the user and detects the third route based on the eye gaze direction, and
the camera unit senses an image having the same range as a visual field of the user.

17. The HMD according to claim 1, wherein
the camera unit periodically detects the first route and the second route based on an update cycle,
the eye gaze detection unit periodically detects the third route based on the update cycle, and
wherein the controller is further configured to update the reference object on which the focus of the camera unit is set every update cycle.

18. The HMD according to claim 1, wherein the controller is further configured to compare a direction, velocity, and movement distance of the first moving object moving along the first route with a direction, velocity, and movement distance of the user's eye gaze to determine whether the detected first route identical with the detected third route.

19. A control method of an HMD comprising:
detecting, via a camera unit, a first route of a first moving object and a second route of a second moving object in front of the HMD;
detecting, via an eye gaze detection unit, a third route along which a user's eye gaze moves;
selecting, via a controller, a reference object from a plurality of real moving objects including the first moving object and the second moving object, wherein the reference object is selected by comparing the third route of the eye gaze with each route of the plurality of real moving objects;
setting, via the controller, the first moving object as the reference object if the detected first route of the first moving object is substantially identical with the detected third route;
setting, via the controller, the second moving object as the reference object if the detected second route of the second moving object is substantially identical with the detected third route;
setting, via the controller, a focus of the camera unit on the set reference object based on a route of the set reference object and the detected third route, and
displaying on a display unit, via the controller, visual information between an eye of the user and the reference object,
wherein the plurality of real moving objects are not images displayed by the display unit.

* * * * *